(12) United States Patent
Yi et al.

(10) Patent No.: US 9,067,613 B2
(45) Date of Patent: Jun. 30, 2015

(54) BRAKE MECHANISM FOR AN INFANT STROLLER APPARATUS

(71) Applicant: Wonderland Nurserygoods Company Limited, Central Hong Kong (HK)

(72) Inventors: Zehua Yi, Central Hong Kong (HK); Xiaojian Zhang, Central Hong Kong (HK); Haibo Zeng, Central Hong Kong (HK); Wanquan Zhu, Central Hong Kong (HK)

(73) Assignee: Wonderland Nurserygoods Company Ltd., Hong Kong (HK)

( * ) Notice: Subject to any disclaimer, the term of this patent is extended or adjusted under 35 U.S.C. 154(b) by 0 days.

(21) Appl. No.: 14/022,347

(22) Filed: Sep. 10, 2013

(65) Prior Publication Data

US 2014/0070505 A1 Mar. 13, 2014

(30) Foreign Application Priority Data

Sep. 12, 2012 (CN) .......................... 2012 1 0337504

(51) Int. Cl.
*B62B 7/02* (2006.01)
*B62B 9/08* (2006.01)
*B62B 7/04* (2006.01)

(52) U.S. Cl.
CPC . *B62B 9/087* (2013.01); *B62B 7/04* (2013.01); *B62B 9/082* (2013.01); *B62B 7/02* (2013.01); *B62B 2205/10* (2013.01)

(58) Field of Classification Search
CPC .............................................. B62B 9/08–9/087
See application file for complete search history.

(56) References Cited

U.S. PATENT DOCUMENTS

| | | | |
|---|---|---|---|
| 5,373,917 A | 12/1994 | Kamman | |
| 5,765,665 A * | 6/1998 | Cheng et al. | 188/20 |
| 6,170,615 B1 | 1/2001 | Cheng | |
| 2003/0057681 A1 | 3/2003 | Lan | |
| 2005/0242548 A1 | 11/2005 | Hutchinson et al. | |
| 2010/0308553 A1 | 12/2010 | Li et al. | |
| 2011/0048867 A1 * | 3/2011 | Solinski et al. | 188/20 |
| 2012/0031714 A1 * | 2/2012 | Chen et al. | 188/69 |

* cited by examiner

*Primary Examiner* — Jeffrey J Restifo
*Assistant Examiner* — Erez Gurari
(74) *Attorney, Agent, or Firm* — David I. Roche; Baker & McKenzie LLP

(57) ABSTRACT

A brake mechanism suitable for use with an infant stroller apparatus includes two wheel supports adapted to affix with two transversally spaced-apart legs of the infant stroller apparatus, two wheels respectively assembled with the two wheel supports about a rotation axis, wherein each of the two wheels includes a hub portion, two latches respectively assembled with the two wheel supports and operable to rotationally lock the two wheels, and a brake actuating assembly including two cam surfaces in sliding contact with the two latches, wherein the two cam surfaces are operable to rotate about the rotation axis to cause displacements of the two latches parallel to the rotation axis to respectively engage and disengage the hub portions of the two wheels.

20 Claims, 26 Drawing Sheets

BRAKE MECHANISM FOR AN INFANT STROLLER APPARATUS

CROSS-REFERENCE TO RELATED APPLICATION

This application claims priority to Chinese Patent Application No. 201210337504.3 filed on Sep. 12, 2012, which is incorporated herein by reference.

BACKGROUND

1. Field of the Invention

The present inventions relate to brake mechanisms for infant stroller apparatuses.

2. Description of the Related Art

Currently available infant strollers may incorporate brake devices at the rear wheel assemblies to provide safer use. However, the construction of the brake devices are usually complex, difficult to assemble, and may be subject to premature wear.

Therefore, there is a need for an improved structure that can address at least the aforementioned issues.

SUMMARY

The present application describes a brake mechanism suitable for use in an infant stroller apparatus. In some embodiments, the brake mechanism includes two wheel supports adapted to affix with two transversely spaced-apart legs of the infant stroller apparatus, two wheels respectively assembled with the two wheel supports about a rotation axis, wherein each of the two wheels includes a hub portion, two latches respectively assembled with the two wheel supports and operable to rotationally lock the two wheels, and a brake actuating assembly including two cam surfaces in sliding contact with the two latches, wherein the two cam surfaces are operable to rotate about the rotation axis to cause displacements of the two latches parallel to the rotation axis to respectively engage and disengage the hub portions of the two wheels.

The brake mechanisms described herein use cam surfaces to effectively drive locking and unlocking displacement of the latches, which can be operated by rotation of the brake actuating assembly. Accordingly, the brake mechanisms are relatively simple in construction, and are easy to operate.

DETAILED DESCRIPTION OF THE EMBODIMENTS

FIGS. 1-6 are schematic views illustrating an embodiment of an infant stroller apparatus 1 having a brake mechanism. The infant stroller apparatus 1 can include a support frame 10, and two rear legs 11 that are transversely spaced apart from each other and are connected with the support frame 10. A brake mechanism 100 can be assembled with the two rear legs 11. FIGS. 2-6 are schematic views illustrating further construction details of the brake mechanism 100.

Figure 2:
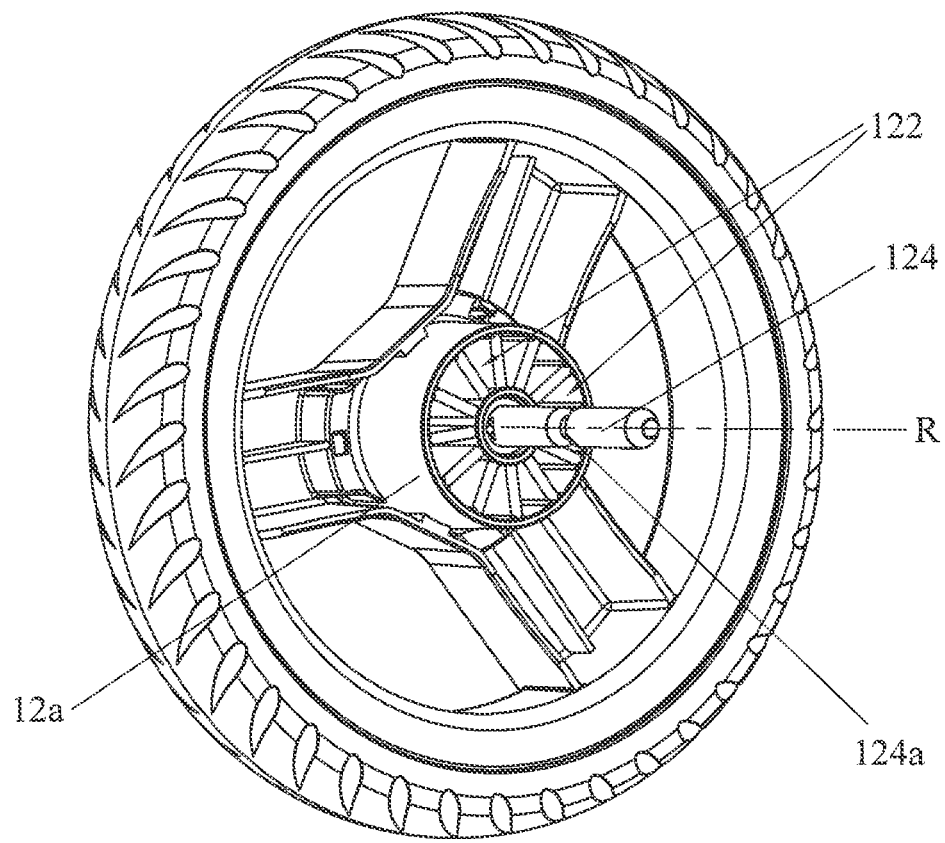
FIG. 2 is a schematic view illustrating the construction of a wheel used in the infant stroller apparatus shown in FIG. 1.

Referring to FIGS. 2-6, each of the rear legs 11 can include a wheel 12 and a wheel support 13. The wheel support 13 can be fixedly connected with the rear leg 11, and the wheel 12 can be pivotally assembled with the wheel support 13 about a rotation axis R. As shown in FIG. 2, a hub portion 12a of the wheel 12 can be affixed with an axle 124 that can be pivotally connected with the wheel support 13 about the rotation axis R of the wheel 12. An intermediate region of the axle 124 can include a recessed neck portion 124a. The hub portion 12a can include a plurality of apertures 122 distributed radially around the rotation axis R in uniform manner.

Figure 3:
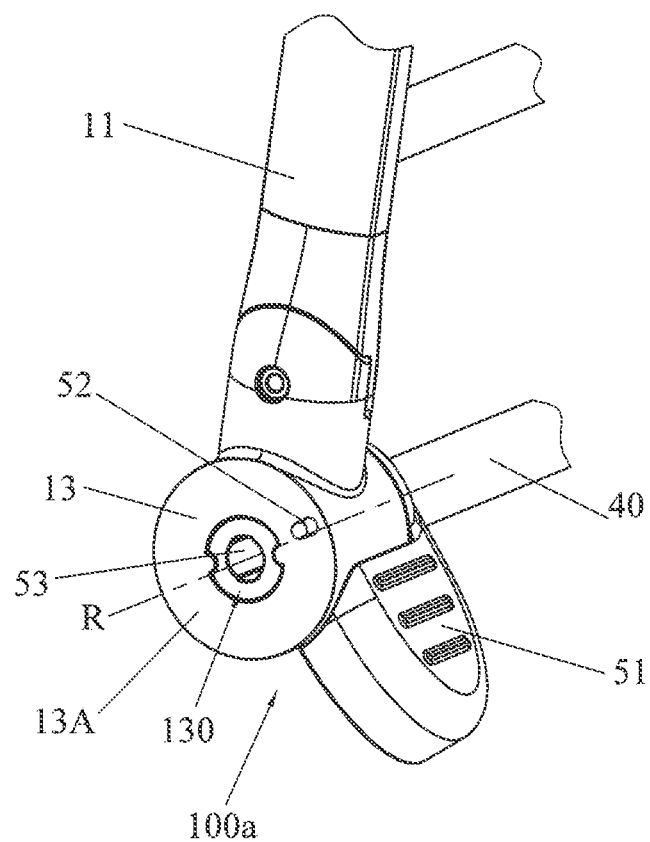
FIG. 3 is a schematic view illustrating a brake mechanism used in the infant stroller apparatus shown in FIG. 1.
Figure 4:
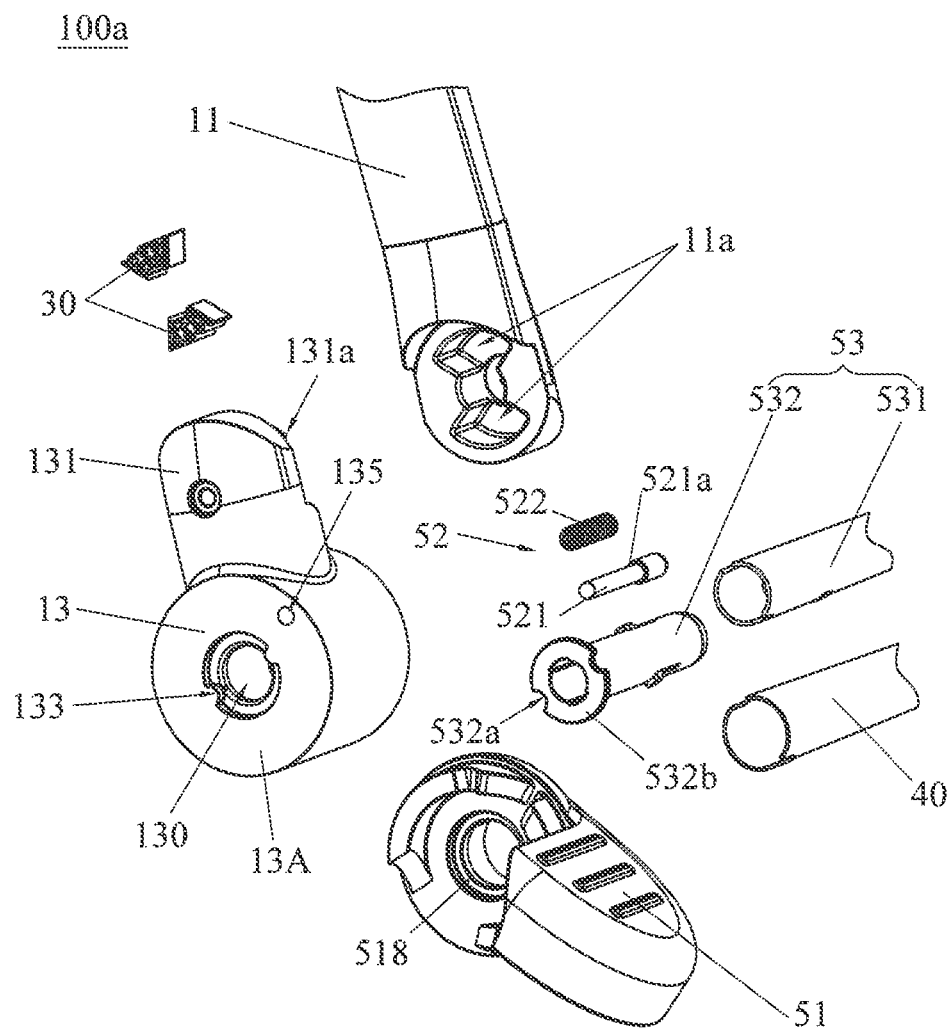
FIG. 4 is an exploded view of the brake mechanism shown in FIG. 3.
Figure 6:
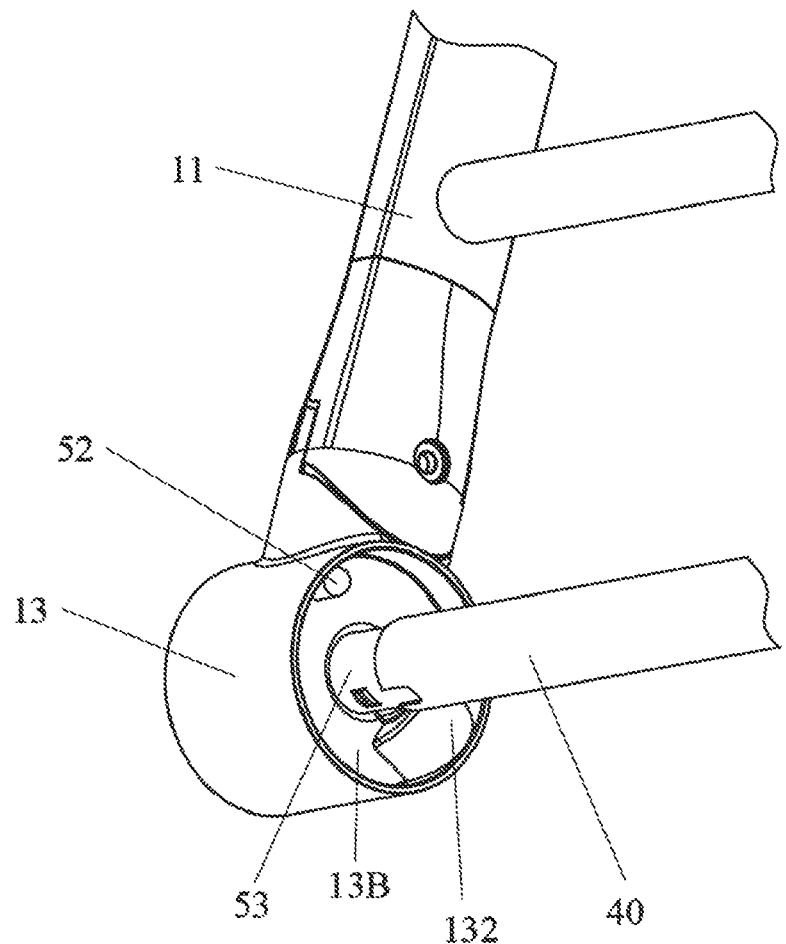
FIG. 6 is a schematic view illustrating a wheel support to which is assembled the brake mechanism shown in FIG. 3.

Referring to FIGS. 3, 4 and 6, the wheel support 13 can be formed in an integral body, and includes a coupling portion 131 affixed with the rear leg 11. The wheel support 13 can have an outer side surface 13A adjacently facing the corresponding wheel 12, and an opposite inner side surface 13B facing a middle region between the two rear legs 11. The wheel support 13 can have a central hole 130 that is formed through the two side surfaces 13A and 13B for the assembly of the axle 124, and radial protrusions 133 formed at a rim of the central hole 130. Another hole 135 can be formed through the wheel support 13 and open on the two side surfaces 13A and 13B at a position eccentric from the central hole 130. The side surface 13B can have a protrusion 132 at another position eccentric from the central hole 130, e.g., diametrically opposite to the hole 135.

One or more shock absorber 30 (e.g., two ones as shown) can be arranged at a junction between the coupling portion 131 and the rear leg 11. More specifically, the one or more shock absorbers 30 can be received in one or more slot 11a provided in a lower end portion of the rear leg 11 and can be in contact with respective protuberances 131a (better shown in FIG. 8) provided in the coupling portion 131. The protuberances 131a can squeeze and cause deformation of the shock absorbers 30 so as to absorb shock or vibration occurring when the wheels 12 roll on an irregular ground surface.

Figure 1:
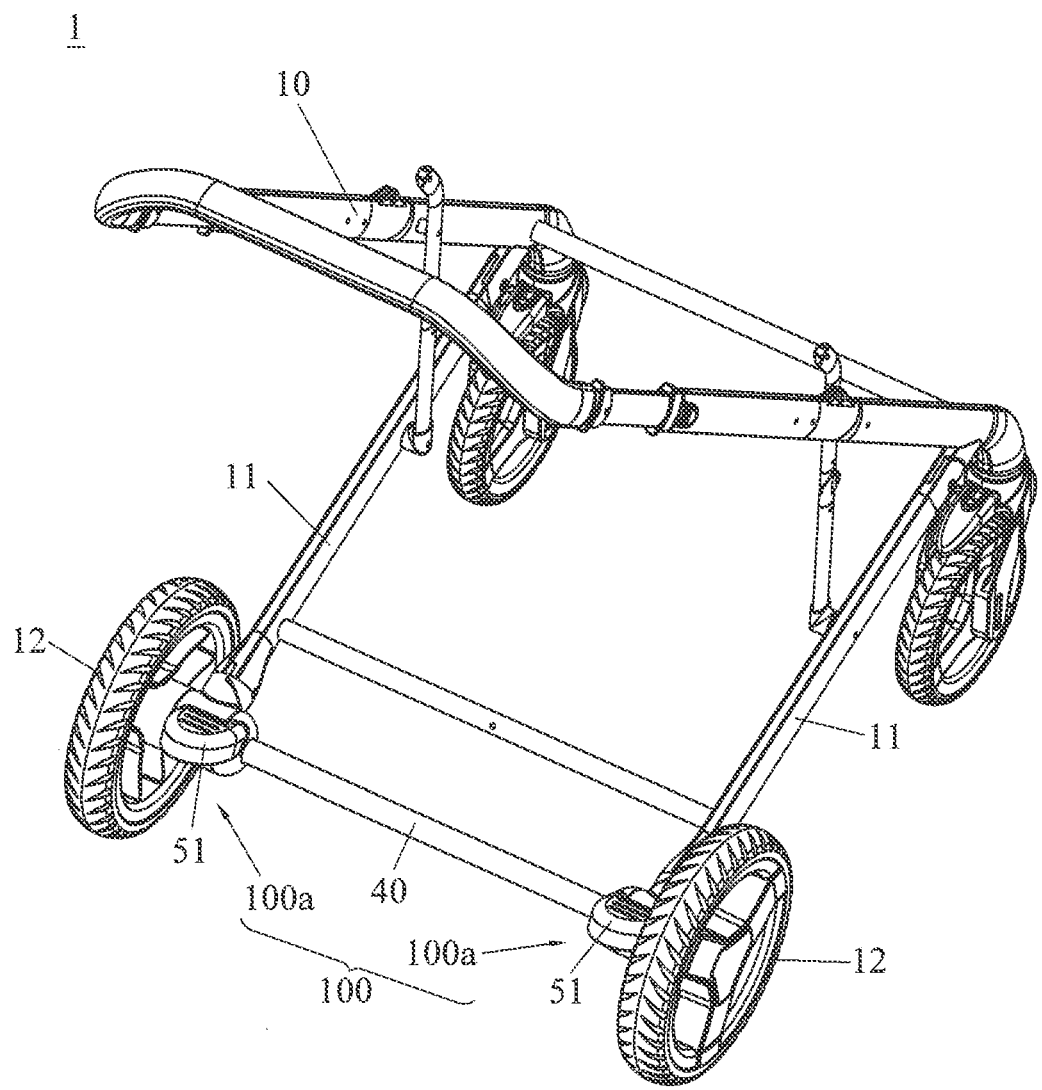
FIG. 1 is a perspective view illustrating an infant stroller apparatus having a brake mechanism.

Referring to FIGS. 1, 3 and 4, the brake mechanism 100 can include two subassemblies 100a respectively associated with the two wheel supports 13, and a linkage 40 transversally connected with the two subassemblies 100a. Each of the subassemblies 100a can be similar in construction, including a brake actuator 51 and a latch 52. The brake actuator 51 can be pivotally connected with the wheel support 13 about the rotation axis R of the wheel 12. The latch 52 can be a spring-loaded latch assembled through the hole 130 of the wheel support 13, and can be driven in movement by the brake actuator 51 to engage and disengage the hub portion 12a for rotationally locking and unlocking the wheel 12.

Figure 5:
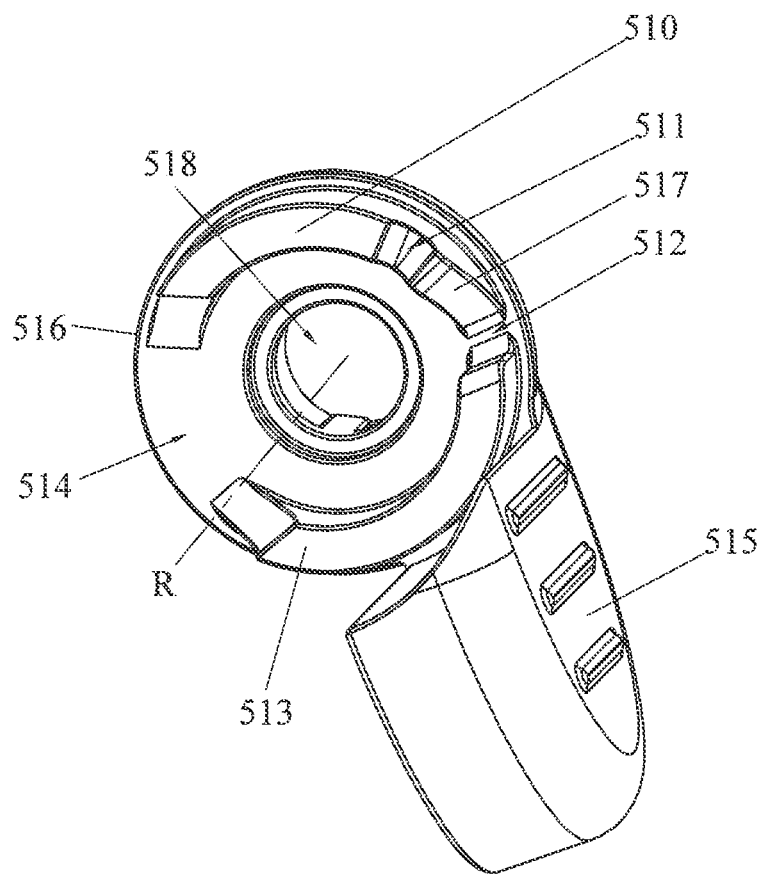
FIG. 5 is a perspective view illustrating a brake actuator used in the brake mechanism shown in FIG. 3.

Referring to FIG. 5, the brake actuator 51 can be formed as a unitary part including an annular portion 516 that has a central hole 518 and a ridge 510 projecting sideways along the rotation axis R and around the central hole 518. The ridge 510 can define a locking recess 511, an unlocking recess 512 deeper than and spaced apart from the locking recess 511, and a sloped cam surface 517 extending along a top of the ridge 510 from the unlocking recess 512 to the locking recess 511. The brake actuator 51 can further include a pedal portion 515 that is connected with the annular portion 516 and can be operable to cause rotation of the brake actuator 51.

Referring to FIGS. 5 and 6, the brake actuator 51 can further include a channel 514 in which the protrusion 132 of the wheel support 13 is at least partially received. Another ridge 513 can protrude from the annular portion 516 and encircle at least partially the central hole 518, the ridge 513 being separated from the ridge 510 via the channel 514 and the unlocking recess 512. When the brake actuator 51 is assembled with the wheel support 13, the protrusion 132 of the wheel support 13 can be confined to move within the channel 514 and abut against the ridge 510 or 513, which can delimit a range of rotational displacement of the brake actuator 51 relative to the wheel support 13.

Referring again to FIG. 4, the latch 52 can include a pin 521 and a spring 522. The pin 521 can be formed with a shoulder portion 521a protruding radially. The spring 522 can be assembled around the pin 521 and oppositely abut against the shoulder portion 521a of the pin 521 and the wheel support 13. The spring 522 can bias the latch 52 in a direction parallel to the rotation axis R so that an inner end of the pin 521 is kept in contact with the brake actuator 51, in particular the cam surface 517. The latch 52 thereby assembled can be operable to move parallel to the rotation axis R The linkage 40 can be exemplary formed as a tube. The linkage 40 can extend transversally between the two rear legs 11, and can have two opposite ends respectively assembled fixedly through the central holes 518 of the two brake actuators 51. The two brake actuators 51 can accordingly be assembled adjacent to the wheel supports 13, and can rotate in unison via the connection of the linkage 40. The two brake actuators 51 and the linkage 40 can form a brake actuating assembly operable to drive concurrent displacements of the two latches 52 to effect rotational locking and unlocking of the two wheels 12.

Referring again to FIG. 4, a wheel coupling assembly 53 may be arranged transversally through the linkage 40 and has two opposite ends respectively affixed with the wheel supports 13 of the two rear legs 11. The wheel coupling assembly 53 can include a transversal tube 531, and two bearing parts 532 (only one is shown for clarity) fixedly secured with two opposite ends of the transversal tube 531. Each of the bearing parts 532 can have a tubular segment fixedly inserted into the transversal tube 531, and a flange 532b projecting around the tubular segment and provided with grooves 532a. The tubular segment of the bearing part 532 can be inserted through the central hole 130 of the corresponding wheel support 13 and through the transversal tube 531, until the flange 532b of the bearing part 532 engages with the rim around the central hole 130 and the radial protrusions 133 of the wheel support 13 respectively engage with the grooves 532a of the bearing part 532. The bearing part 532 can be thereby tightly secured with the wheel support 13, and rotation of the wheel coupling assembly 53 relative to the wheel supports 13 can be blocked.

Figure 9:
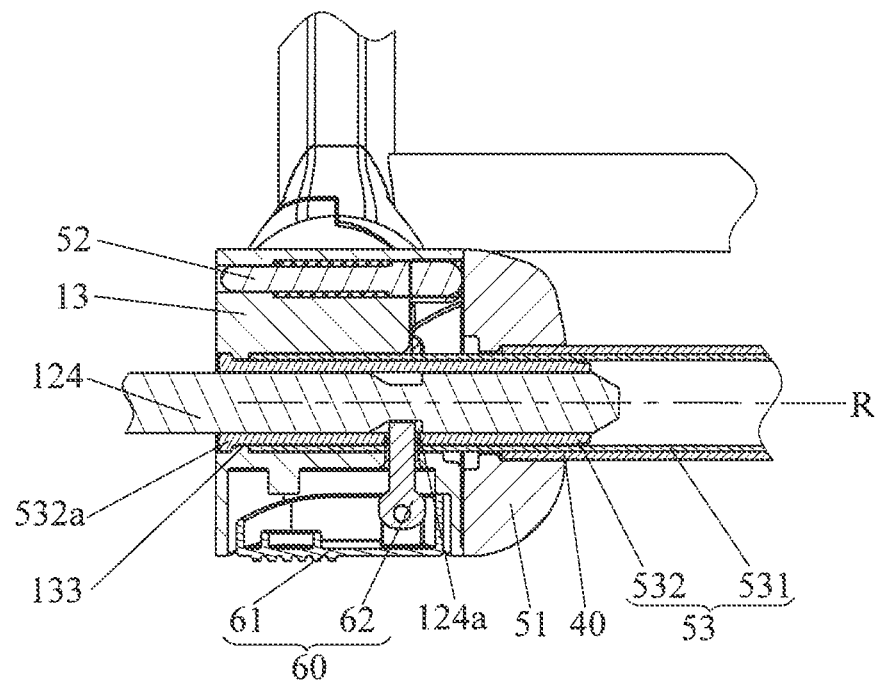
FIG. 9 is a cross-sectional view of the brake mechanism shown in FIG. 3 in an unlocking state.
Figure 10:
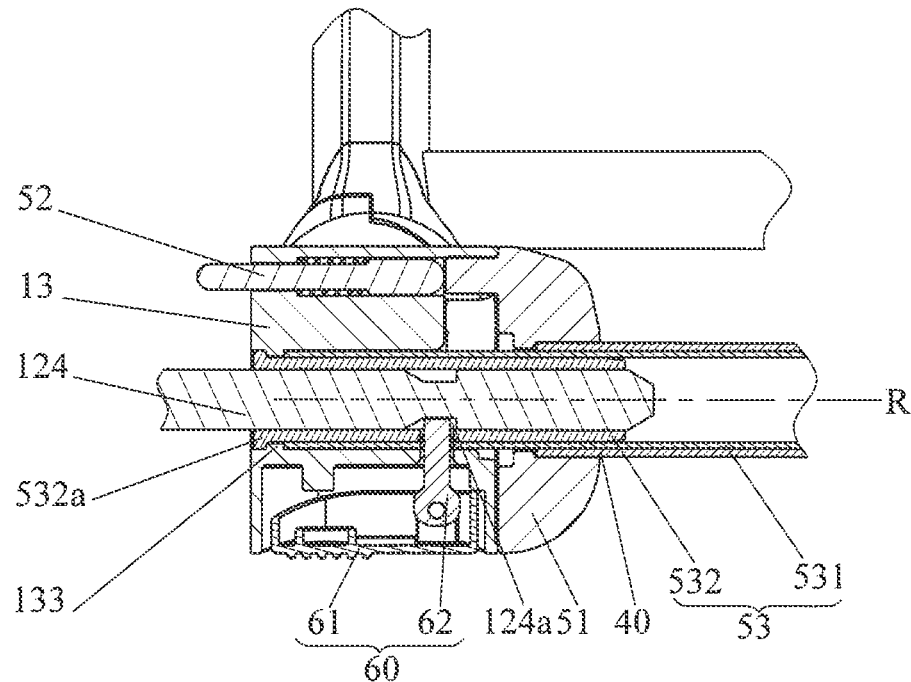
FIG. 10 is a cross-sectional view of the brake mechanism shown in FIG. 3 in a locking state.
Figure 11:
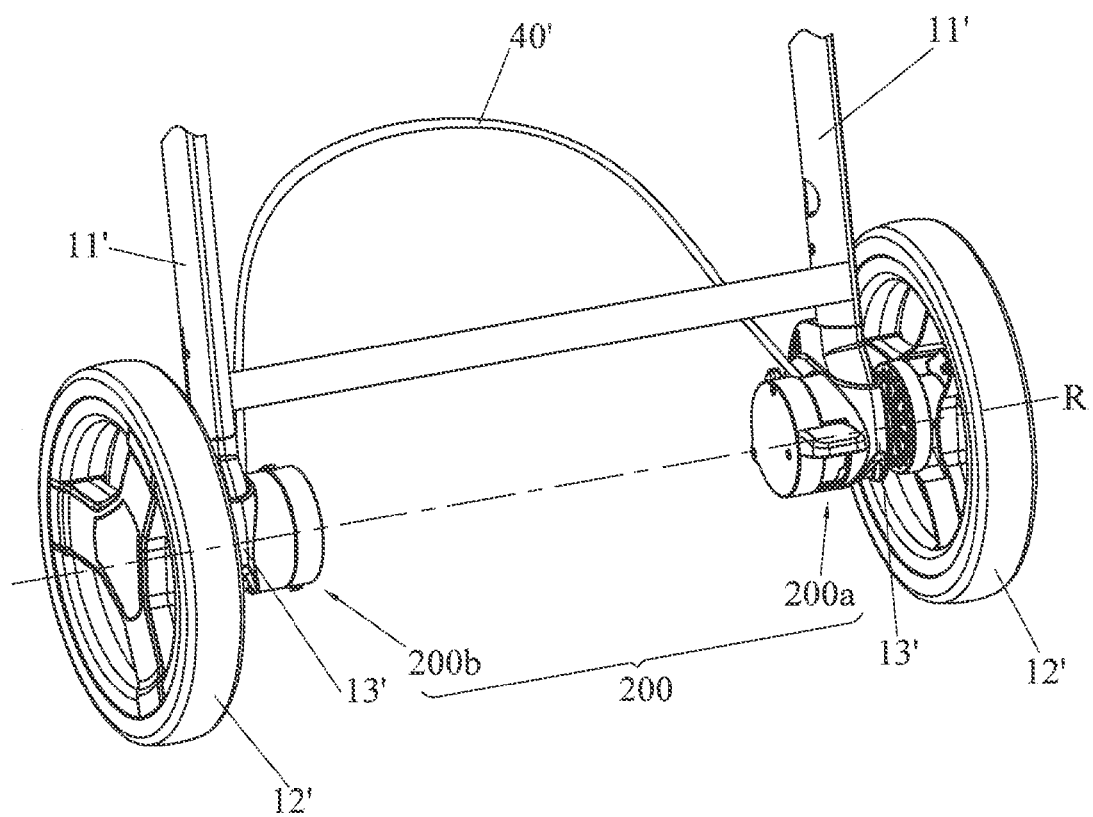
FIG. 11 is a perspective view illustrating another embodiment of a brake mechanism used in an infant stroller apparatus.

FIGS. 9 and 10 are cross-sectional views illustrating the assembly of the axle 124 through the wheel support 13. A wheel holding assembly 60 can be provided to restrainedly hold the axle 124 with the wheel support 13. The wheel holding assembly 60 can include an axle restraint member 62 assembled with the wheel support 13, and a release structure 61 operatively connected with the axle restraint member 62. The axle 124 of each wheel 12 can be pivotally mounted through the bearing part 532 of the corresponding wheel support 13. The axle restraint member 62 can be movable radially relative to the rotation axis R to engage through the bearing part 532 into the neck portion 124a of the axle 124, which thereby blocks axial displacement of the axle 124. Because the assembled axle 124 lies out of contact with the wheel support 13, frictional wear of the wheel support 13 due to contact with the rotating wheel 12 can be advantageously prevented. For removing the wheel 12, the release structure 61 can be operated to cause the axle restraint member 62 to disengage from the neck portion 124a. The wheel 12 then can be axially pulled out for removal from the wheel support 13.

Exemplary operation of the brake mechanism 100 is described hereinafter with reference to FIGS. 1-6 and 9-10. When the stroller apparatus 1 is moving, each of the latches 52 is retracted toward the interior of the wheel support 13 so as to be received at least partially in the unlocking recess 512 of the corresponding brake actuator 51. This unlocking configuration is schematically shown in FIG. 9.

When the stroller apparatus 1 rests stationary, one of the two pedal portions 515 can be operated to rotationally lock the wheels 12. This rotational displacement of the pedal portion 515 can cause concurrent rotation of the two brake actuators 51 and the linkage 40 about the rotation axis R relative to the transversal tube 531. As a result, the cam surfaces 517 can rotate about the rotation axis R to respectfully push the latches 52 to disengage from the unlocking recesses 512 and move oppositely parallel to the rotation axis R toward the outside of the wheel supports 13. This transversal displacement of the latches 52 can compress the springs 522. The brake actuators 51 can rotate until the ends of the latches 52 that are in sliding contact with the cam surfaces 517, respectively, reach the locking recesses 511, which corresponds to a locking state where the latches 52 extend outside the wheel supports 13 and respectively engage with a pair of corresponding apertures 122 in the hub portions 12a of the wheels 12. This locking configuration is schematically shown in FIG. 10.

For rotationally unlocking the wheels 12, one of the two pedal portions 515 can be operated to cause reverse rotation of the brake actuators 51 and the linkage 40 about the rotation axis R. As a result, the cam surfaces 517 can rotate about the rotation axis R to respectively push the latches 52 to disengage from the locking recesses 511. The spring force exerted by the springs 522 can then urge the latches 52 to slide in contact with the cam surfaces 517, which can guide a relative displacement of the latches 52 toward the unlocking recesses 512. The latches 52 can be disengaged from the hub portion 12a of the wheels 12 in a stable unlocking state when the latches 52 respectively reach the positions of the unlocking recesses 512 on the brake actuators 51.

The aforementioned construction can substantially enclose the active parts of the brake mechanism 100 in a confined space to prevent clogging induced by dirt or other undesirable substances.

Figure 7:
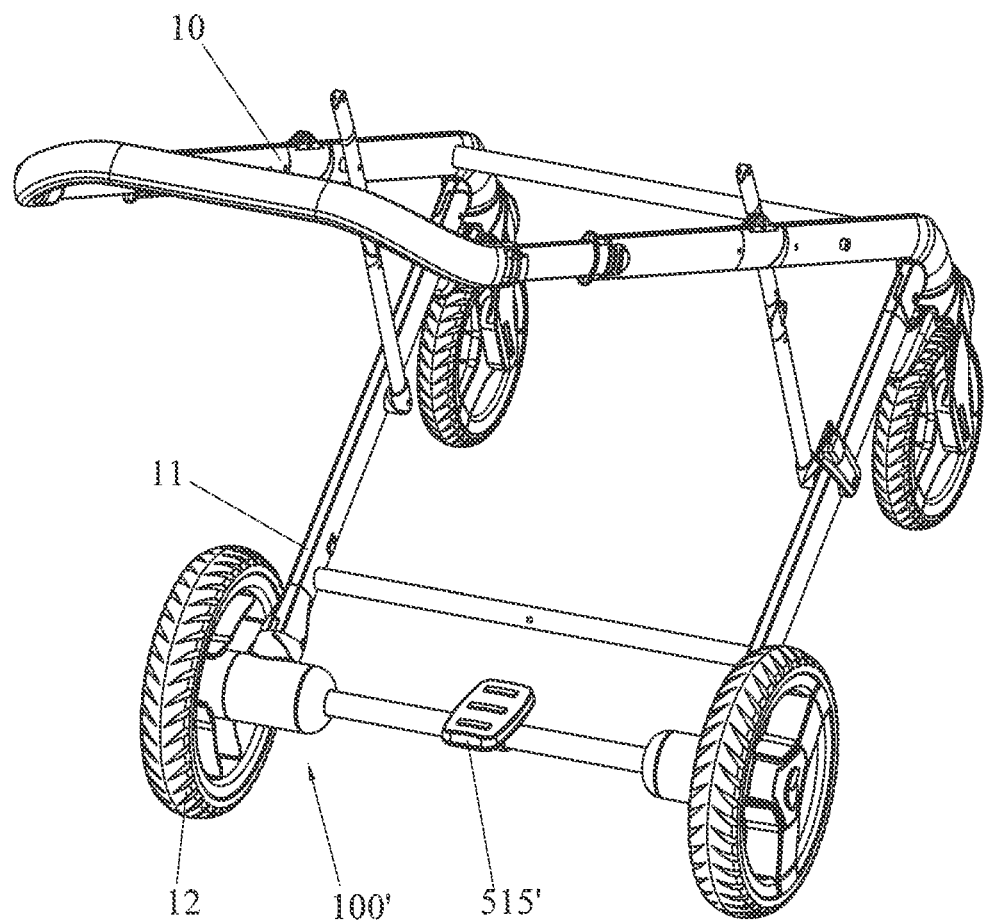
FIG. 7 is a perspective view illustrating an infant stroller apparatus having another embodiment of a brake mechanism.
Figure 8:
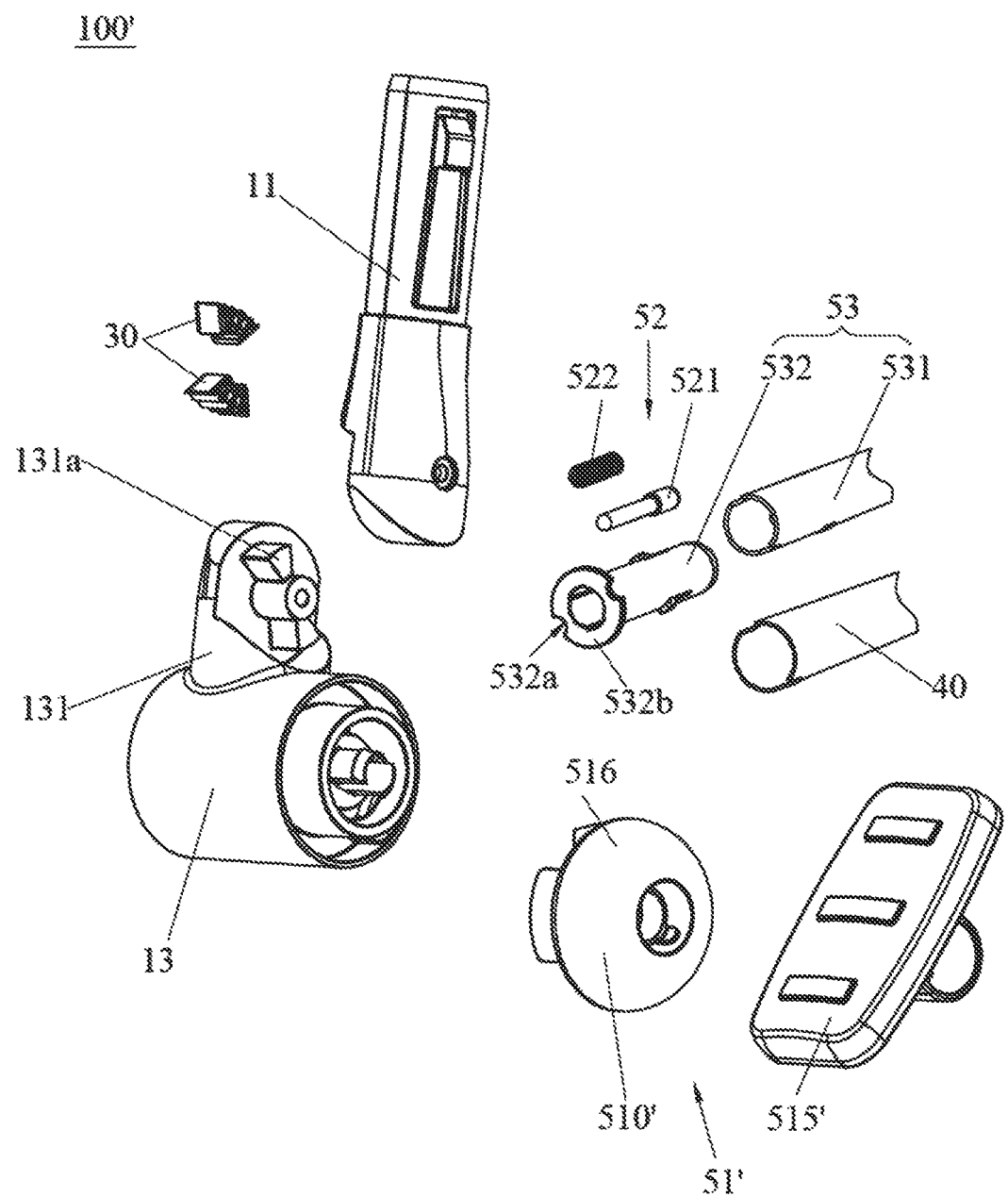
FIG. 8 is an exploded view illustrating a construction of a brake mechanism used in the infant stroller apparatus shown in FIG. 7.

FIGS. 7 and 8 are schematic views illustrating another infant stroller apparatus 2 provided with a variant brake mechanism 100'. The brake mechanism 100' can be generally similar to the brake mechanism 100 described previously. One difference of the brake mechanism 100' lies in the construction of the brake actuator 51' that is formed substantially similar to the brake actuator 51 but with no pedal portion. The brake actuator 51' can be constructed as an actuating part 510' that is integrally formed with the annular portion 516 described previously. In the brake mechanism 100', a single pedal portion 515' can be affixed with the linkage 40 (e.g., at a central region thereof) apart from the actuating part 510'. When a caregiver wants to release the brake mechanism 100', the single pedal portion 515' can be operated to cause rotation of the linkage 40, which in turn drives rotation of the brake actuator 51' to unlock the latches 52 like previously described.

The placement of the single pedal portion 515' on the linkage 40 can facilitate its access for actuating the brake mechanism 100'. While the position of the pedal portion 515' is exemplary shown at a middle of the linkage 40, any other locations on the linkage 40 may also be possible.

FIGS. 11-22 are schematic views illustrating another infant stroller apparatus 3 having another brake mechanism 200. The infant stroller apparatus 3 can include two rear legs 11', each of which is provided with a wheel 12' and a wheel support 13'. The wheel support 13' can be affixed with the rear leg 11', and the wheel 12' can be pivotally connected with the wheel support 13'.

Figure 12:
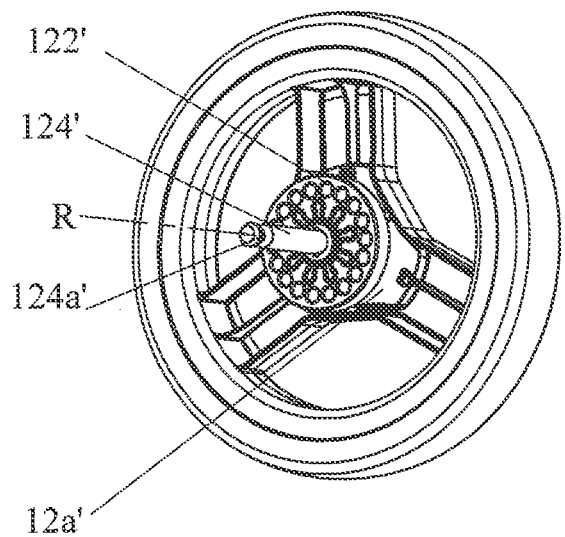
FIG. 12 is a schematic view illustrating the construction of a wheel used in the infant stroller apparatus shown in FIG. 11.
Figure 13:
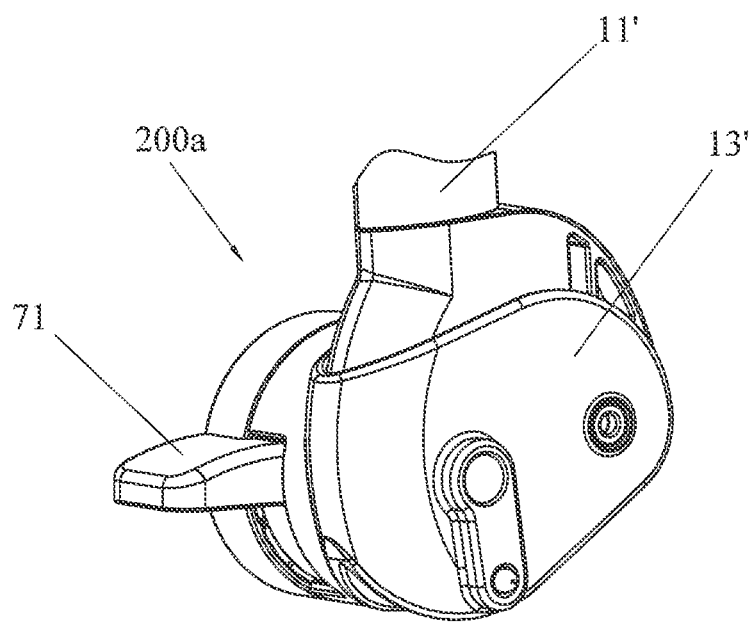
FIG. 13 is a schematic view illustrating a first subassembly of a brake mechanism used in the infant stroller apparatus shown in FIG. 11.

Referring to FIG. 12, a hub portion 12a' of the wheel 12' can be affixed with an axle 124' that is pivotally connected with the wheel support 13' about the rotation axis R of the wheel 12'. The axle 124' can have a neck portion 124a' formed as a recess in the cylindrical shape of the axle 124'. The hub portion 12a' can include a plurality of apertures 122' distributed uniformly along a circumference around the rotation axis R.

The brake mechanism 200 can include two subassemblies 200a and 200b respectively associated with the two wheel supports 13', and a linkage 40' transversally connected with the two subassemblies 200a and 200b.

Figure 14:
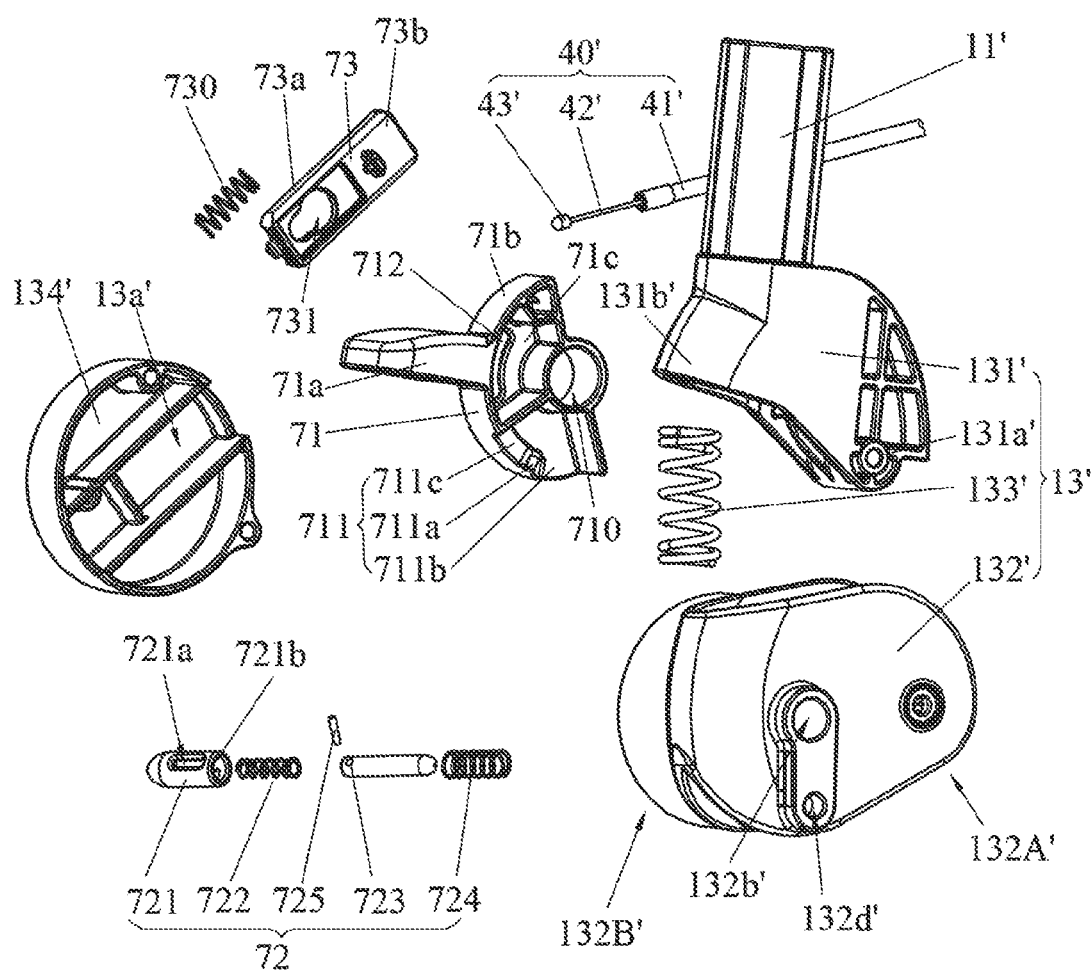
FIG. 14 is an exploded view of the first subassembly shown in FIG. 13.

Referring to FIG. 14, the wheel support 13' can be formed by the assembly of a fixed part 131' and a pivotal part 132' pivotally connected with each other. The fixed part 131' can be affixed with one corresponding rear leg 11', and the pivotal part 132' can assemble with the axle 124' of one wheel 12'. More specifically, the fixed part 131' can have a first portion 131a' inserted into and pivotally connected with the pivotal part 132', and a second portion 131b' that is eccentric from the pivotal axis about which the pivotal part 132' rotates relative to the fixed part 131'. A shock absorber 133' can be disposed between the second portion 131b' and the pivotal part 132' so as to absorb vibration or shock occurring when the wheels 12' roll on an irregular ground surface.

The pivotal part 132' can have two opposite side surfaces 132A' and 132B', the side surface 132A' being adjacent to the wheel 12', and the side surface 132B' being configured to receive the arrangement of the component parts of the subassembly 200a. The pivotal part 132' can include a hole 132b' that opens on the side surface 132A' for passage of the axle 124' and connects with a hollow shaft portion 132c' (better shown in FIG. 21) protruding from the side surface 132B'.

Referring to FIGS. 14, 15, 20 and 21, the subassembly 200a can include a brake actuator 71, a latch 72 and an axle restraint member 73. The brake actuator 71 can be formed as a unitary part including a shell body 71b having a central hole 710 with an axis aligned with the rotation axis R, and a pedal portion 71a protruding from a rim of the shell body 71b in a radial direction relative to the axis of the hole 710. The shell body 71b can include a ridge 711 that is adjacent to the rim of the shell body 71b and projects sideways parallel to the axis of the hole 710 (i.e., corresponding to the rotation axis R) from a base surface 71c of the shell body 71b. The ridge 711 can define a locking recess 711c, an unlocking recess 711b deeper than the locking recess 711c, and a cam surface having a protrusion 711a between the locking recess 711c and the unlocking recess 711b. The base surface 71c of shell body 71 can further include a slot 712 having an arc shape centered on the axis of the hole 710.

The brake actuator 71 can be pivotally connected with the pivotal part 132' with the shaft portion 132c' disposed through the hole 710, and a pin 132a' protruding from the pivotal part 132' can be guided for sliding movement along the slot 712. The brake actuator 71 can be thereby operable to rotate about the rotation axis R, and the slot 712 can delimit the range of rotational displacement of the brake actuator 71 relative to the wheel support 13'.

The latch 72 can be formed by the assembly of a sleeve 721 and a pin 723. The sleeve 721 can have an elongated slot 721a, and the pin 723 can have a protrusion 725. The pin 723 can be movably assembled through the sleeve 721, and the protrusion 725 can be guided for movement along the elongated slot 721a, the range of displacement of the pin 723 relative to the sleeve 721 being delimited by the elongated slot 721a. A spring 724 can be assembled around the pin 723, and can have two opposite ends respectively connected with an edge 721b of the sleeve 721 and an inner sidewall of the pivotal part 132'. Another spring 722 can be arranged in the sleeve 721, and can have two opposite ends respectively connected with an inner sidewall of the sleeve 721 and a structural feature on the pin 723 (e.g., a sidewall of the pin 723 or the protrusion 725).

The latch 72 can be assembled through a hole 132d' that is formed through the pivotal part 132' eccentric from the hole 132b' and opens on the two opposite side surfaces 132A' and 132B' of the pivotal part 132'. On the side surface 132B' of the pivotal part 132', the sleeve 721 can be in contact with the ridge 711 of the brake actuator 71. When the brake actuator 71 rotates about the shaft portion 132c', the spring 724 can bias the sleeve 721 into sliding contact against the ridge 711. Depending on the direction of rotation of the brake actuator 71, the latch 72 can be driven in movement along the hole 132d' parallel to the rotation axis R to either protrude outward from the side surface 132A' for engagement with any aperture 122' of the hub portion 12a', or to retract toward the interior of the pivotal part 132' for disengaging from the hub portion 12a'. A stable locking state where the latch 72 is kept engaged with the hub portion 12a' can be reached when the sleeve 721 of the latch 72 is positioned in the locking recess 711c of the brake actuator 71, and a stable unlocking state where the latch 72 is kept disengaged from the hub portion 12a' can be reached when the sleeve 721 of the latch 72 is positioned in the unlocking recess 711b of the brake actuator 71.

Referring again to FIGS. 14, 15, 20 and 21, the axle restraint member 73 can have an elongated shape including a first portion 73a movably assembled adjacent to a distal end of the shaft portion 132c', and a second portion 73b extending outside the pivotal part 132'. For facilitating the assembly of the axle restraint member 73, a cover 134' may be affixed with the pivotal part 13' and have a slot 13a' in which the axle restraint member 73 is movably assembled. The cover 134' can thereby substantially enclose and provide protection for the component parts of the subassemblies 200a. The first portion 73a of the axle restraint member 73 can include an opening 731 having a first and a second opening region 731a and 731b communicating with each other. The first opening region 731a is greater than the second opening region 731b in size, and is larger than the cross-section of the axle 124'. The second opening region 731b is smaller than the cross-section of the axle 124', but larger than the cross-section of the neck portion 124a'.

A spring 730 can be connected with the first portion 73a of the axle restraint member 73 and an inner sidewall of the pivotal part 132'. The spring 730 can bias the axle restraint member 73 to a position where the first opening region 731a is misaligned from the hole 132b'.

For assembling the wheel 12' with the wheel support 13', the second portion 73b of the axle restraint member 73 can be pushed radially relative to the rotation axis R to compress the spring 730 and cause the first opening region 731a to be substantially aligned with the rotation axis R and the hole 132b' of the wheel support 13'. The axle 124' then can be inserted from the side surface 132A' through the hole 132b', and pass through the first opening region 731a. Once the neck portion 124a' is aligned with the opening 731 of the axle restraint member 73, the spring 730 can bias the axle restraint member 73 so that the neck portion 124a' can become engaged with the second opening region 731b. The axle restraint member 73 can thereby block axial displacement of the axle 124' and hold the wheel 12' with the wheel support 13'.

For removing the wheel 12' from the wheel support 13', the second portion 73b of the axle restraint member 73 can be pushed to cause the neck portion 124a' to disengage from the second opening region 731b and the first opening region 731a to be aligned with the axle 124'. The axle 124' then can be pulled out of the axle restraint member 73 and the hole 132b' of the wheel support 13'. Accordingly, the axle restraint member 73 can allow quick installation and removal of the wheel 12'.

Figure 22:
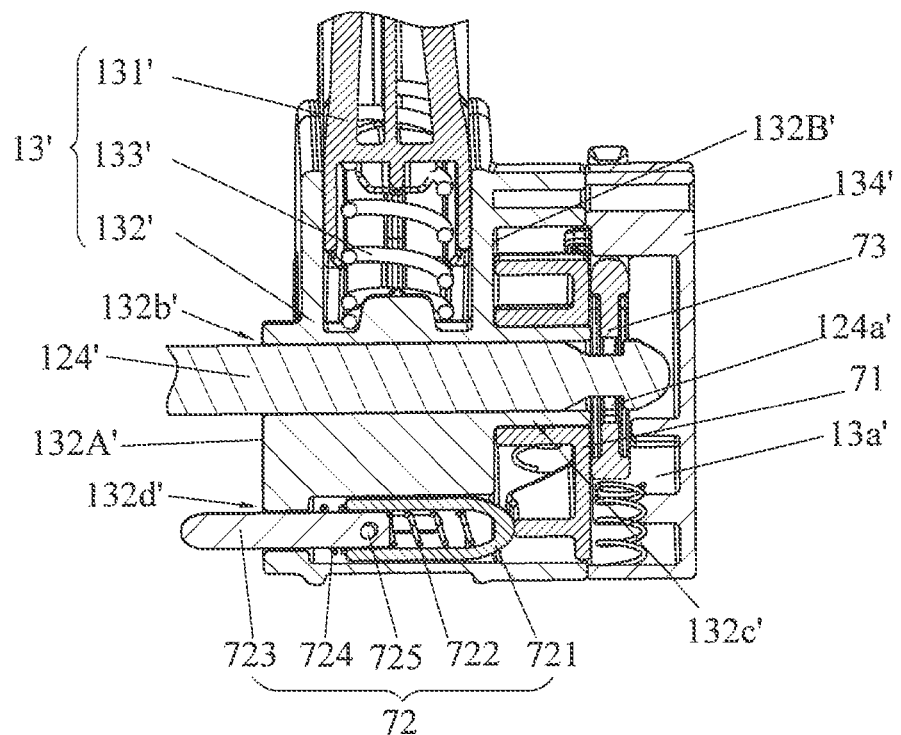
FIG. 22 is a cross-sectional view illustrating the first subassembly of the brake mechanism shown in FIG. 13 in a locking state.

The wheel 12' installed with the wheel support 13' can be rotationally locked by rotating the brake actuator 71 relative to the wheel support 13' in a first direction to displace the locking recess 711c toward the latch 72. This rotation of the brake actuator 71 can be effected, for example, by operating the pedal portion 71a provided on the brake actuator 71. As a result, the cam surface of the ridge 711 can rotate to push the latch 72 in movement along the hole 132d' parallel to the rotation axis R to protrude outward from the side surface 132A' for engagement with one aperture 122' of the hub portion 12a'. This displacement of the latch 72 can compress the spring 724. It is noted that when the latch 72 abuts against an intermediate region of the hub portion 12a' between two apertures 122', the spring 722 may be compressed owing to a displacement of the pin 723 relative to the sleeve 721. This resilient force loaded in the spring 722 may be released when the wheel 12' is slightly rotated such that the pin 723 of the latch 72 becomes aligned with one aperture 122', causing locking engagement of the latch 72. The latch 72 can be engaged with the hub portion 12a' of the wheel 12' in a stable locking state when the latch 72 reaches the position of the locking recess 711c on the brake actuator 71, as shown in FIG. 22. Owing to the protrusion 711a, displacement of the latch 72 away from the locking state can be prevented.

Figure 21:
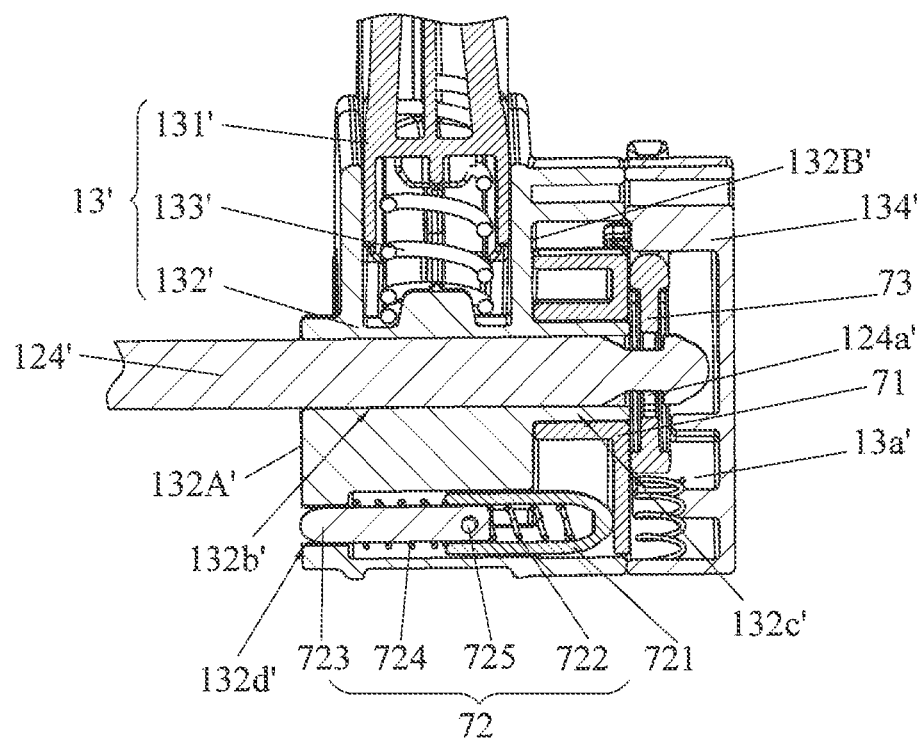
FIG. 21 is a cross-sectional view illustrating the first subassembly of the brake mechanism shown in FIG. 13 in an unlocking state.

For rotationally unlocking the wheel 12', the brake actuator 71 can be rotated in an opposite second direction to displace the unlocking recess 711b toward the latch 72 and overcome the obstacle of the protrusion 711a. Owing to the spring force exerted by the spring 724 and the sliding contact between the latch 72 and the rotating cam surface of the ridge 711, the latch 72 can be guided in movement to retract toward the interior of the pivotal part 132' and disengage from the hub portion 12a' of the wheel 12'. The latch 72 can be disengaged from the hub portion 12a' of the wheel 12' in a stable unlocking state when the latch 72 reaches the position of the unlocking recess 711b on the brake actuator 71, as shown in FIG. 21.

Figure 17:
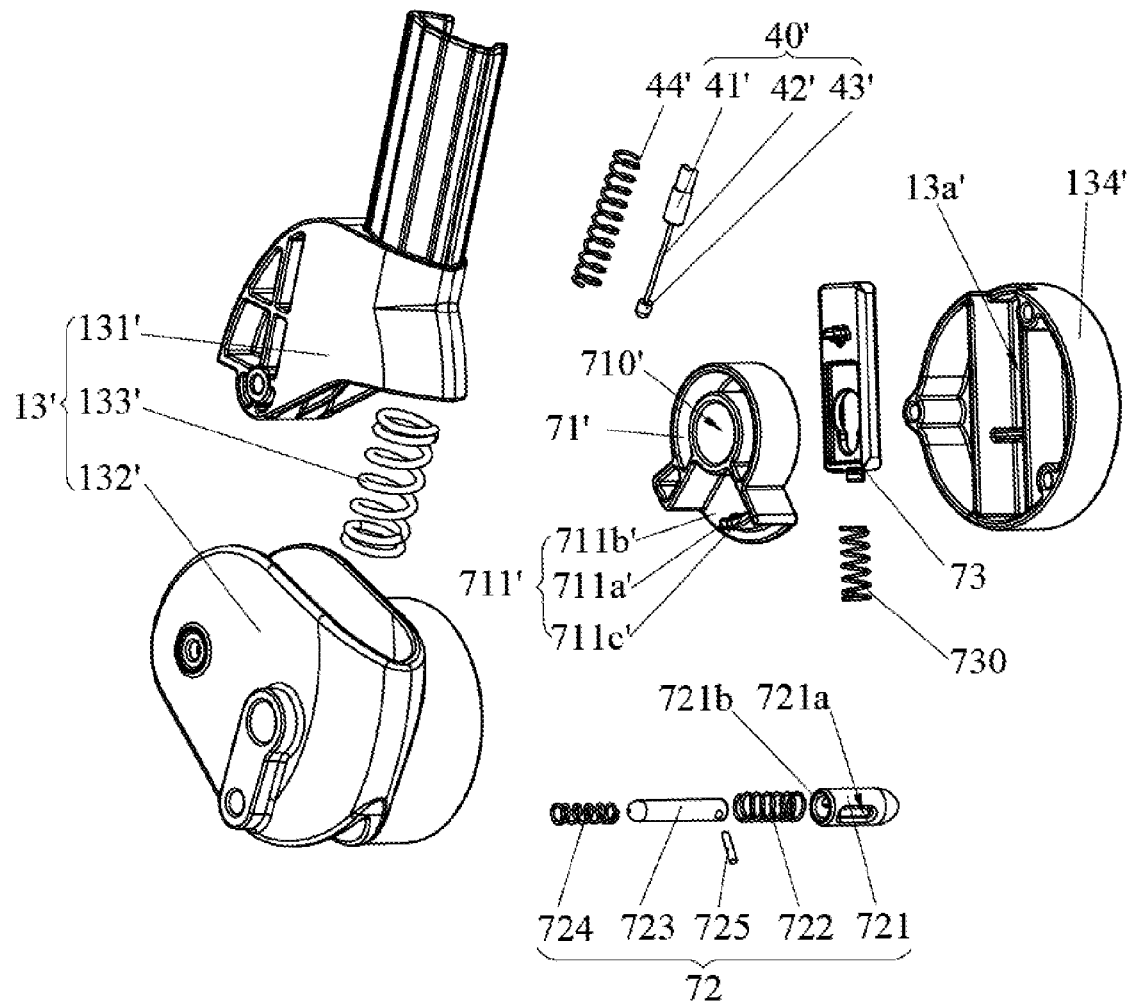
FIG. 17 is an exploded view illustrating a second subassembly of the brake mechanism used in the infant stroller apparatus shown in FIG. 11.

Referring to FIG. 17, the subassembly 200b arranged with the wheel support 13' of the other rear leg 11' can include a brake actuator 71', a latch 72 and an axle restraint member 73. The construction of the wheel support 13', the latch 72 and the axle restraint member 73 in the subassembly 200b can be like previously described for the subassembly 200a.

Like the brake actuator 71, the brake actuator 71' of the subassembly 200b can have a hole 710' for pivotally connecting the brake actuator 71' with the pivotal part 132' of the wheel support 13'. Moreover, the brake actuator 71' can likewise include a ridge 711' that defines a locking recess 711c', an unlocking recess 711b' deeper than the locking recess 711c', and a cam surface having a protrusion 711a' between the locking recess 711c' and the unlocking recess 711b'. The brake actuator 71' can operate like the brake actuator 71 to cause the latch 72 to rotationally lock and unlock the wheel 12'. However, the brake actuator 71 has no pedal portion. For driving concurrent motion of the brake actuators 71 and 71', the linkage 40' can extend transversally so as to operatively connect with the brake actuators 71 and 71'.

Referring to FIGS. 14 and 17, the linkage 40' can be constructed as a flexible and linear part. The linkage 40' can include a cable 42', and a sleeve 41' substantially enclosing the cable 42'. Two opposite ends of the sleeve 41' can be respectively affixed with the two pivotal part 132'. The cable 42' can be movably routed through the sleeve 41', and have two opposite ends 43' that extend outside the sleeve 41' to respectively anchor with the brake actuators 71 and 71' in the two subassemblies 200a and 200b.

Figure 18:
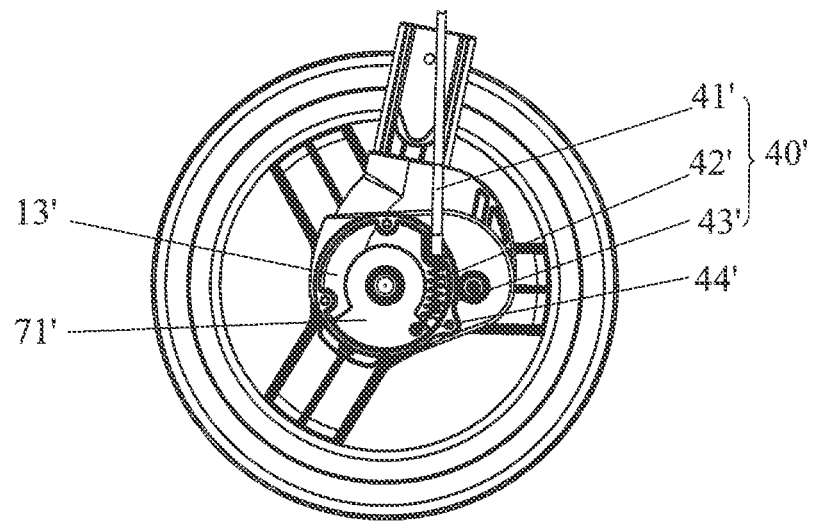
FIG. 18 is a schematic view illustrating the second subassembly of the brake mechanism shown in FIG. 17 in an unlocking state.

As shown in FIGS. 17 and 18, a spring 44' may be assembled around a portion of the cable 42' adjacent to the connection of the end 43' with the brake actuator 71'. The spring 44' can have two ends respectively connected with the brake actuator 71' and an inner sidewall of the pivotal part 132'.

Figure 16:
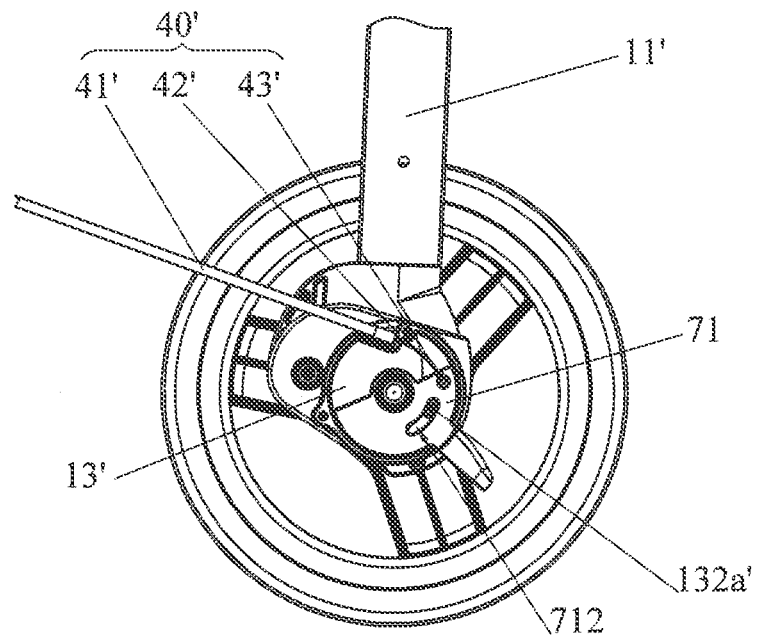
FIG. 16 is a schematic view illustrating the first subassembly of the brake mechanism shown in FIG. 13 in a locking state.
Figure 19:
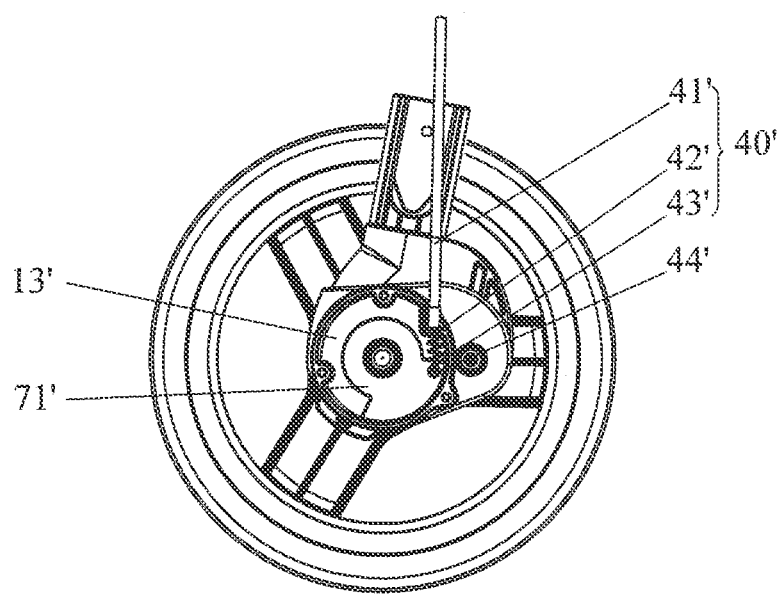
FIG. 19 is a schematic view illustrating the second subassembly of the brake mechanism shown in FIG. 17 in a locking state.
Figure 20:
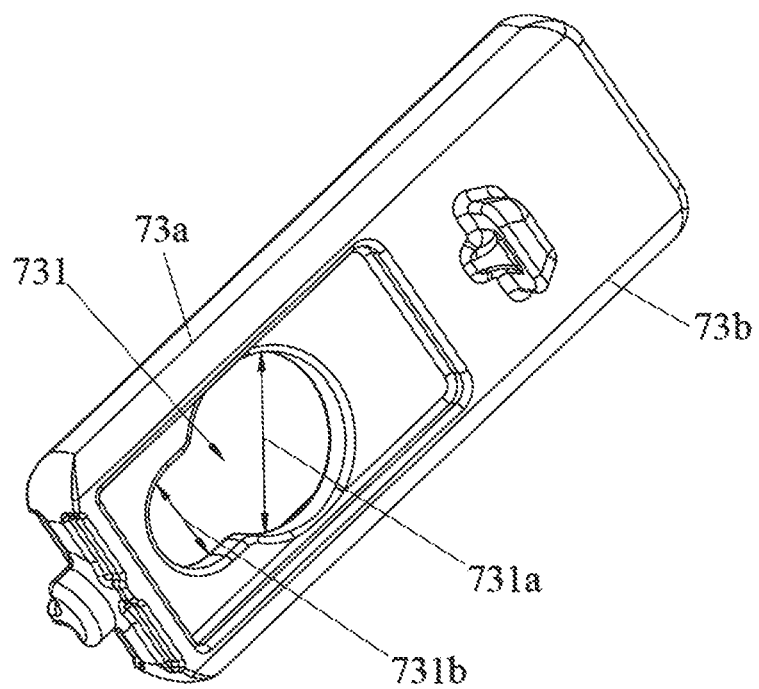
FIG. 20 is a perspective illustrating an axle restraint member used to block axial displacement of a wheel.

When the pedal portion 71a is operated by the caregiver in one first direction to the locking position shown in FIG. 16, the brake actuator 71 in the subassembly 200a can be driven in rotation to cause the corresponding latch 72 to rotationally lock the wheel 12' as described previously. This rotation of the brake actuator 71 can pull on the cable 42', which in turn can pull the brake actuator 71' in the subassembly 200b to concurrently rotate, which in turn can compress the spring 44' and cause the corresponding latch 72 to rotationally lock the other wheel 12' as shown in FIG. 19. Owing to the pulling action continuously applied through the cable 42', the brake actuator 71' in the subassembly 200b can be kept in a stable locking state as long as the brake actuator 71 in the subassembly 200a is maintained in the locking state.

Figure 15:
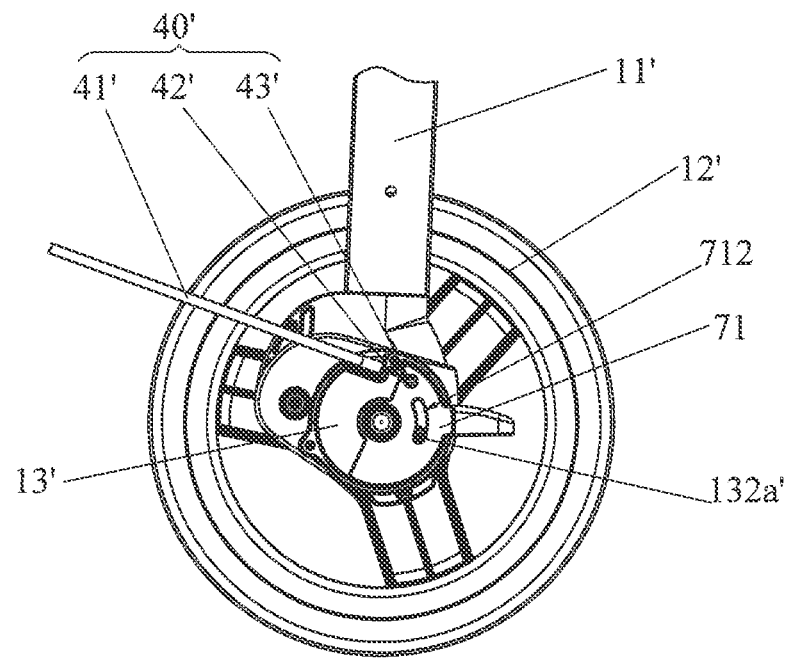
FIG. 15 is a schematic view illustrating the first subassembly of the brake mechanism shown in FIG. 13 in an unlocking state.

When the pedal portion 71a is operated by the caregiver in an opposite second direction to the unlocking position shown in FIG. 15, the brake actuator 71 in the subassembly 200a can be driven in rotation to cause the corresponding latch 12 to rotationally unlock the wheel 12'. This rotation of the brake actuator 71 can release the pulling action of the cable 42', and the loaded spring 44' can urge the brake actuator 71' in the subassembly 200b to concurrently rotate to cause the corresponding latch 72 to rotationally unlock the other wheel 12' as shown in FIG. 18.

The brake actuators 71 and 71' and the linkage 40' as previously described can accordingly form a brake actuating assembly that is operable to drive concurrent displacements of the latches 72 to effect rotational locking and unlocking of the two wheels 12'.

Figure 23:
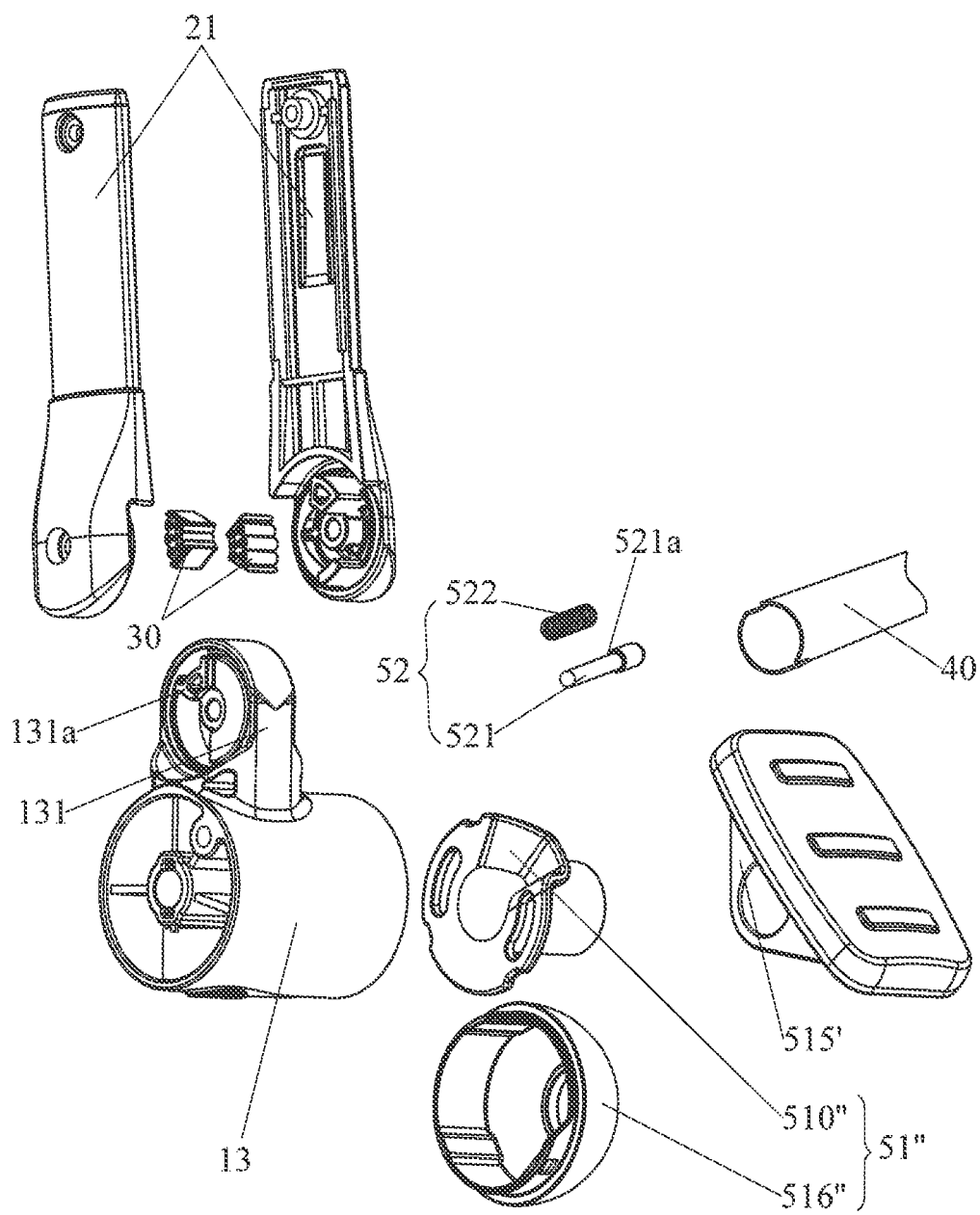
FIG. 23 is an exploded view illustrating another embodiment of a brake mechanism suitable for use in an infant stroller apparatus.
Figure 24:
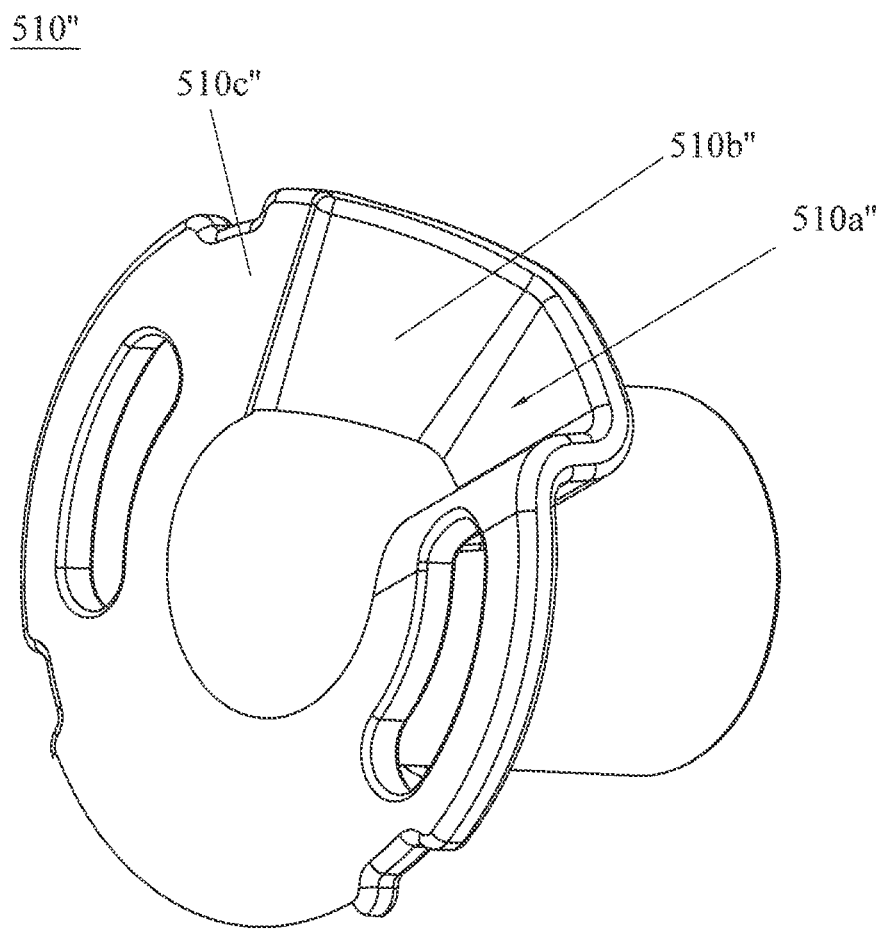
FIG. 24 is a perspective view illustrating an actuating element used in the brake mechanism shown in FIG. 23.
Figure 25:
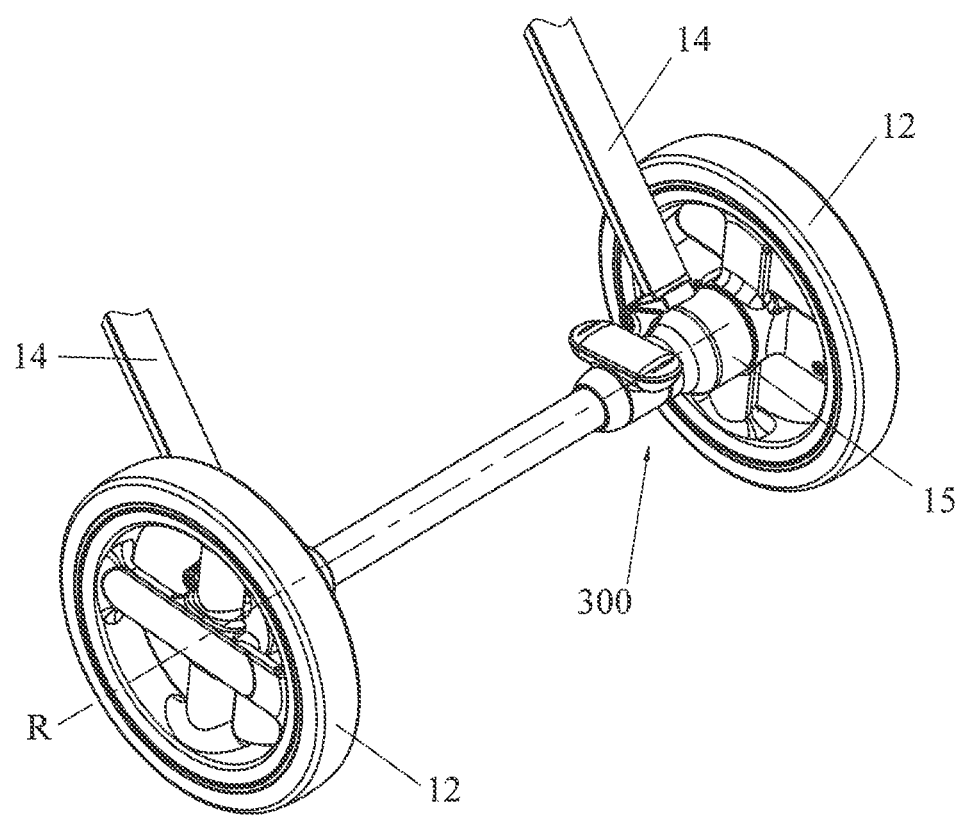
FIG. 25 is a schematic view illustrating another variant embodiment of a brake mechanism suitable for use in an infant stroller apparatus.
Figure 26:
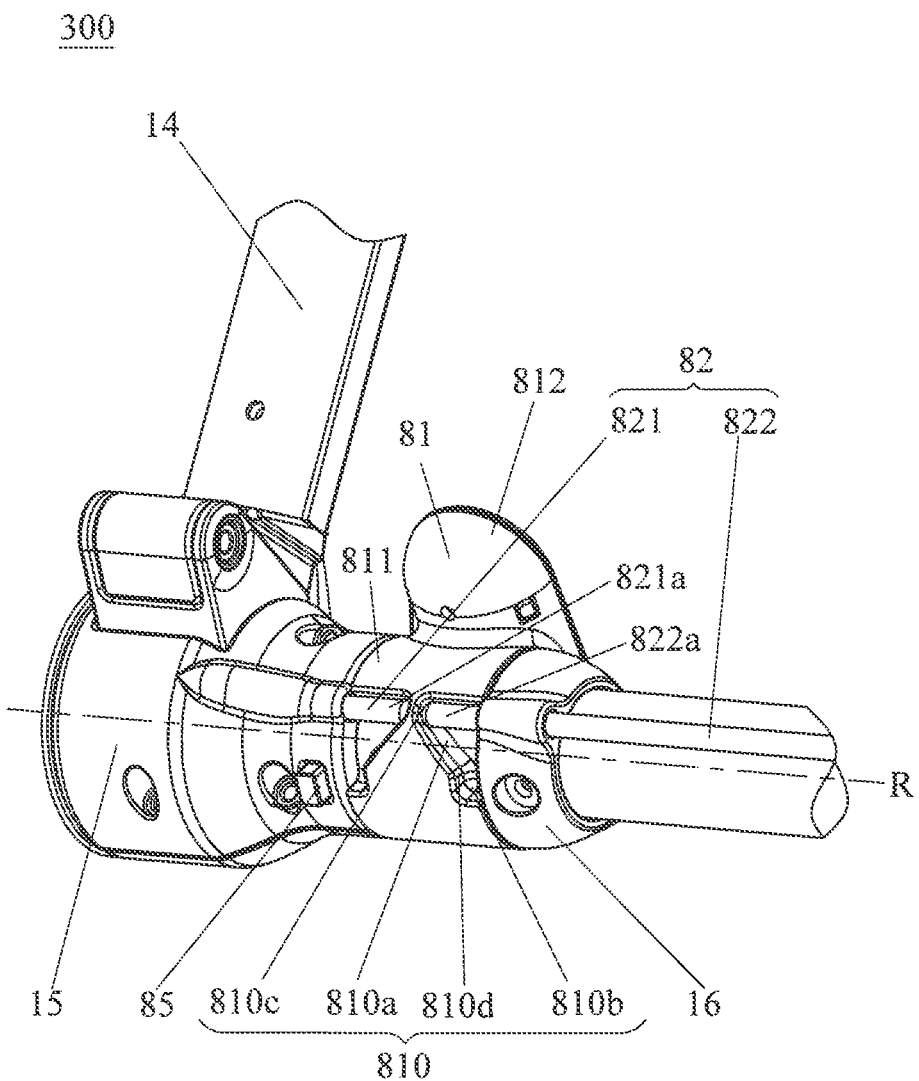
FIG. 26 is an enlarged view illustrating a portion of the brake mechanism shown in FIG. 25.
Figure 27:
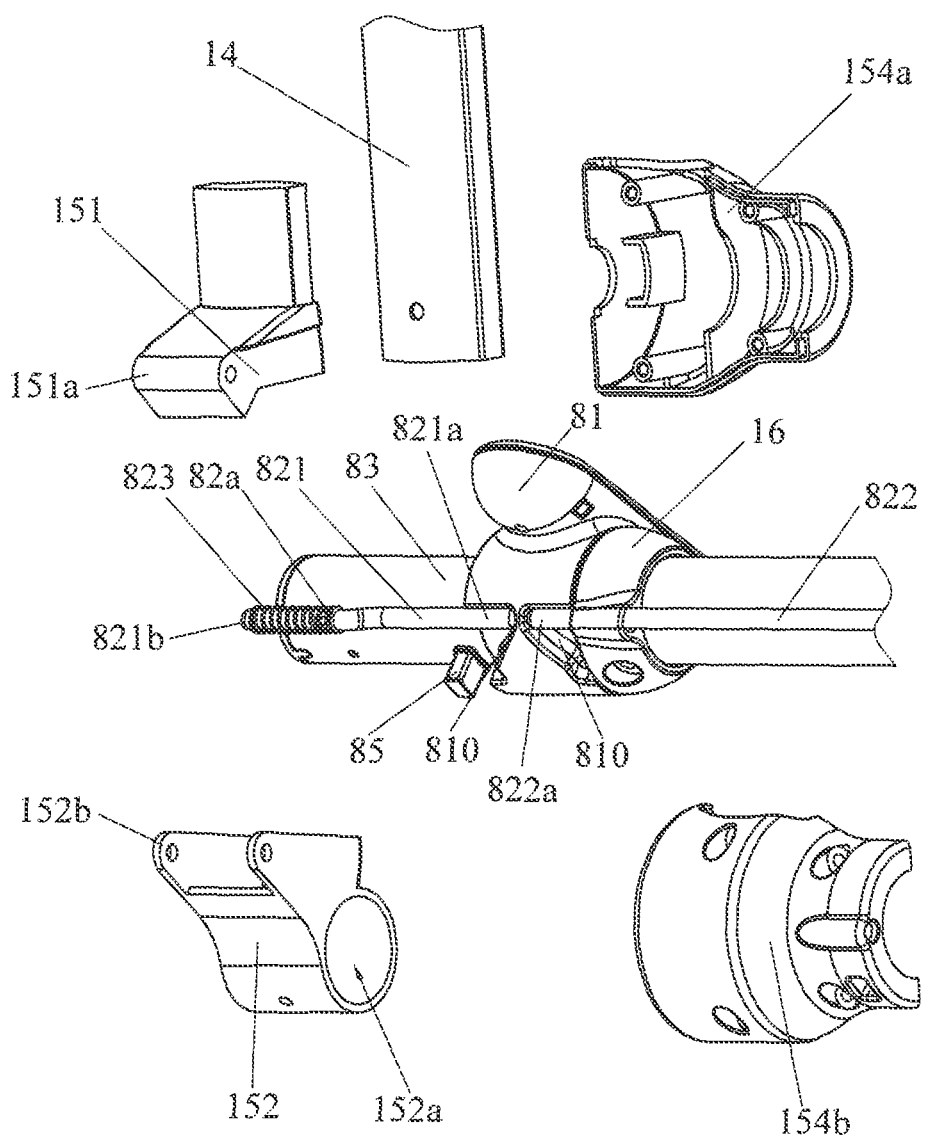
FIG. 27 is a partially exploded view illustrating the portion of the brake mechanism shown in FIG. 26.

FIGS. 23 and 24 are schematic views illustrating another variant embodiment of a brake mechanism 100''. The brake mechanism 100'' is similar to the brake mechanism 100'. One difference of the brake mechanism 100'' is that the brake actuator 51'' is formed by the assembly of an actuating element 510'' and a cover 516'' that can substitute for the actuating part 510'. The use of the actuating element 510'' and a cover 516'' may facilitate the assembly and disassembly for repair. Moreover, no wheel coupling assembly 53 is provided in the embodiment of FIGS. 23 and 24. The actuating element 510'' can be affixed with the linkage 40 formed as a tube. The cover 516'' can be affixed with the wheel support 13 so as to enclose the active parts of the brake mechanism 100''.

As shown in FIG. 24, the actuating element 510'' can have an annular ring that defines a recessed unlocking location 510a'', a raised locking location 510c'', and a cam surface 510b'' between the unlocking location 510a'' and locking location 510c''. When the actuating element 510'' is driven in rotation by the linkage 40, the interaction between the latch 52 and the actuating element 510'' can cause displacement of the latch 52 to engage and disengage the hub portion 12a. It is noted that the latch 52 shown in FIG. 23 may also be replaced with the latch 72 of the brake mechanism 200.

FIGS. 25-31 are schematic views illustrating another infant stroller apparatus 4 having a brake mechanism 300. The infant stroller apparatus 4 can include a support frame and two rear legs 14 connected with the support frame. A brake mechanism 300 can be assembled with the two rear legs 14. Further construction details of the brake mechanism 300 are described hereinafter with reference to FIGS. 2 and 26-31.

Each of the rear legs 14 can include a wheel 12 and a wheel support 15. The wheel support 15 can be fixedly connected with the rear leg 14, and the wheel 12 can be pivotally assembled with the wheel support 15. As shown in FIG. 2, the hub portion 12a of the wheel 12 can be affixed with the axle 124 that can be pivotally connected with the wheel support 15 about the rotation axis R of the wheel 12. The hub portion 12a can include a plurality of apertures 122 distributed radially around the rotation axis R in uniform manner, so that the wheel 12 can be controllably locked at different rotational positions.

Each of the wheel supports 15 can include a fixed part 151, a pivotal part 152, and two housings 154a and 154b. The fixed part 151 can be affixed with the corresponding rear leg 14. The pivotal part 152 can be formed with parallel ear portions 152b that project from a sleeve portion 152a. The ear portion 152b can be pivotally connected with an extension 151a of the fixed part 151. The two housings 154a and 154b can be assembled with each other to enclose at least partially the pivotal part 152, in particular the sleeve portion 152a.

The brake mechanism 300 can include a brake actuator 81, an assembly 82 including two latches 821 and 822, and a wheel coupling tube 83. The wheel coupling tube 83 can extend transversally between the two rear legs 14, and can be fixedly secured through the sleeve portions 152a of the two wheel supports 15.

The brake actuator 81 can include a collar portion 811, and a pedal portion 812 affixed with the collar portion 811. The brake actuator 81, including the collar portion 811 and the pedal portion 812, can be formed as one unitary part. The collar portion 811 can be pivotally assembled about the wheel coupling tube 83, and can be restrainedly positioned between the two housings 154a and 154b of one wheel support 15 and a restraining collar 16 affixed with the wheel coupling tube 83. An outer surface of the collar portion 811 can include two pockets 810 symmetrical in structure that are disposed side by side along the rotation axis R.

Each of the pockets 810 can have a sidewall from which are defined a locking recess 810b, an unlocking recess 810c, and a cam surface 810a disposed between and connected with the locking recess 810b and the unlocking recess 810c. The pockets 810 are disposed such that a distance between the unlocking recesses 810c of the two pockets 810 extending parallel to the rotation axis of brake actuator 81 is smaller than a distance between the locking recesses 810b of the two pockets 810 extending parallel to the same rotation axis of the brake actuator 81. A protrusion 810d can be further formed adjacent to the junction between the cam surface 810a and the locking recess 810b in each pocket 810. The brake actuator 81 as described previously can form the brake actuating assembly operable to drive displacements of the latches 821 and 822 in the brake mechanism 300.

The latches 821 and 822 can have elongated shapes, and can extend substantially aligned with each other along the wheel coupling tube 83. The latch 821 can be guided for axial displacement through a hole 154b1 (better shown in FIG. 29) formed through the housing 154b of one corresponding wheel support 15. The latch 821 can have a first end 821a extending into one pocket 810, and an opposite second end 821b located proximate an outer side surface 154A of the housing 154b adjacently facing the corresponding wheel 12.

The latch 822 can be guided for axial displacement through the restraining collar 16. The latch 822 can likewise have a first end 822a extending into the corresponding pocket 810, and an opposite second end (not shown) located proximate an outer side surface of the housing 154b on the other wheel support 15.

The two latches 821 and 822 may also be respectively connected with two biasing springs 823 (only the spring 823 connected with the latch 821 is shown, the other spring 823 connected with the latch 822 can be identical). One spring 823 assembled with the latch 821 can have two ends respectively connected with an inner sidewall of the housing 154b and a flange 82a protruding from the latch 821. The other spring 823 can be assembled with the latch 822 in a same way. The two springs 823 are operable to bias the latches 821 and 822 toward the pockets 810

Figure 28:
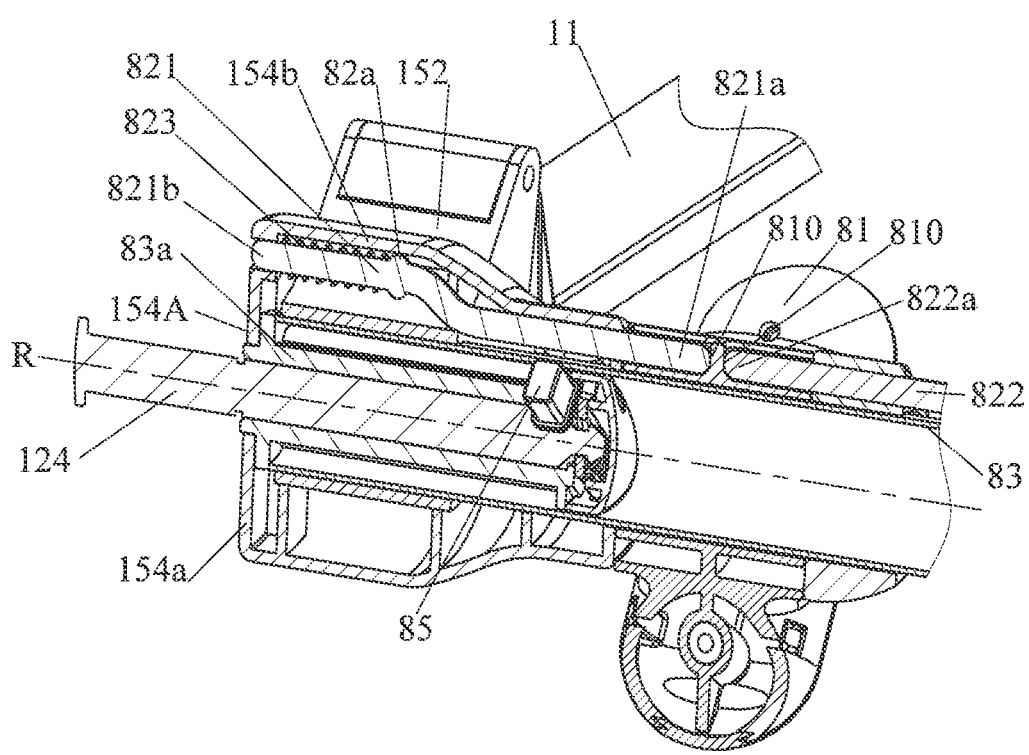
FIG. 28 is a cross-sectional view illustrating the portion of the brake mechanism shown in FIG. 26.
Figure 29:
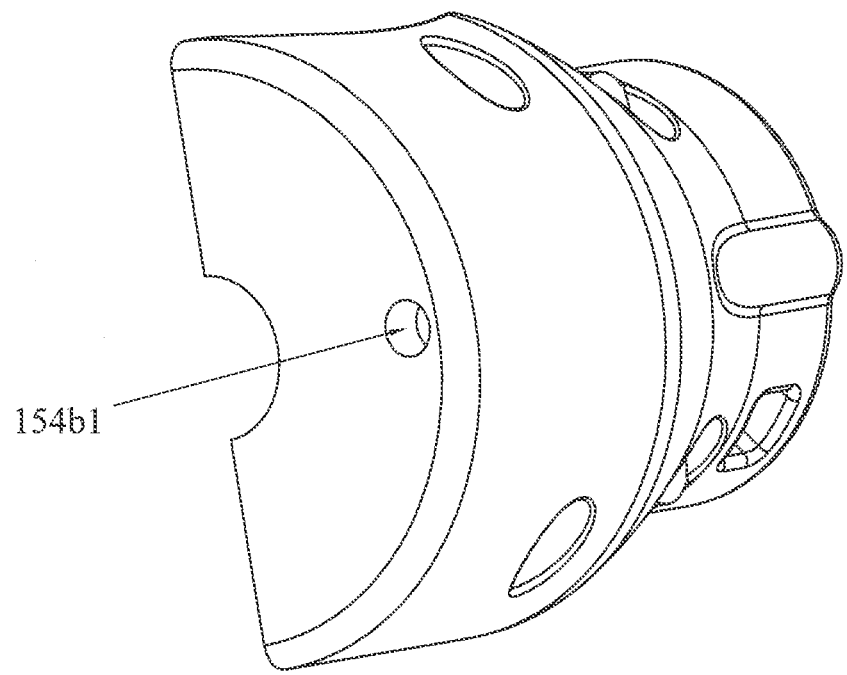
FIG. 29 is a perspective view illustrating a housing part used in the brake mechanism shown in FIG. 26.

Referring to FIG. 28, an interior of the wheel coupling tube 83 can include two bearing parts 83a (only one is shown in FIG. 28 for clarity, the other one can be similar in construction) fixedly assembled at two opposite ends of the wheel coupling tube 83. The axle 124 of each wheel 12 can be pivotally assembled through the corresponding bearing part 83a. Two axle restraint members 85 (only one is shown in FIG. 28 for clarity, the other one can be similar in construction) can also be provided to block axial displacement of the axles 124. For example, the axle restraint member 85 may be similar to the axle restraint member 73 described previously.

Figure 30:
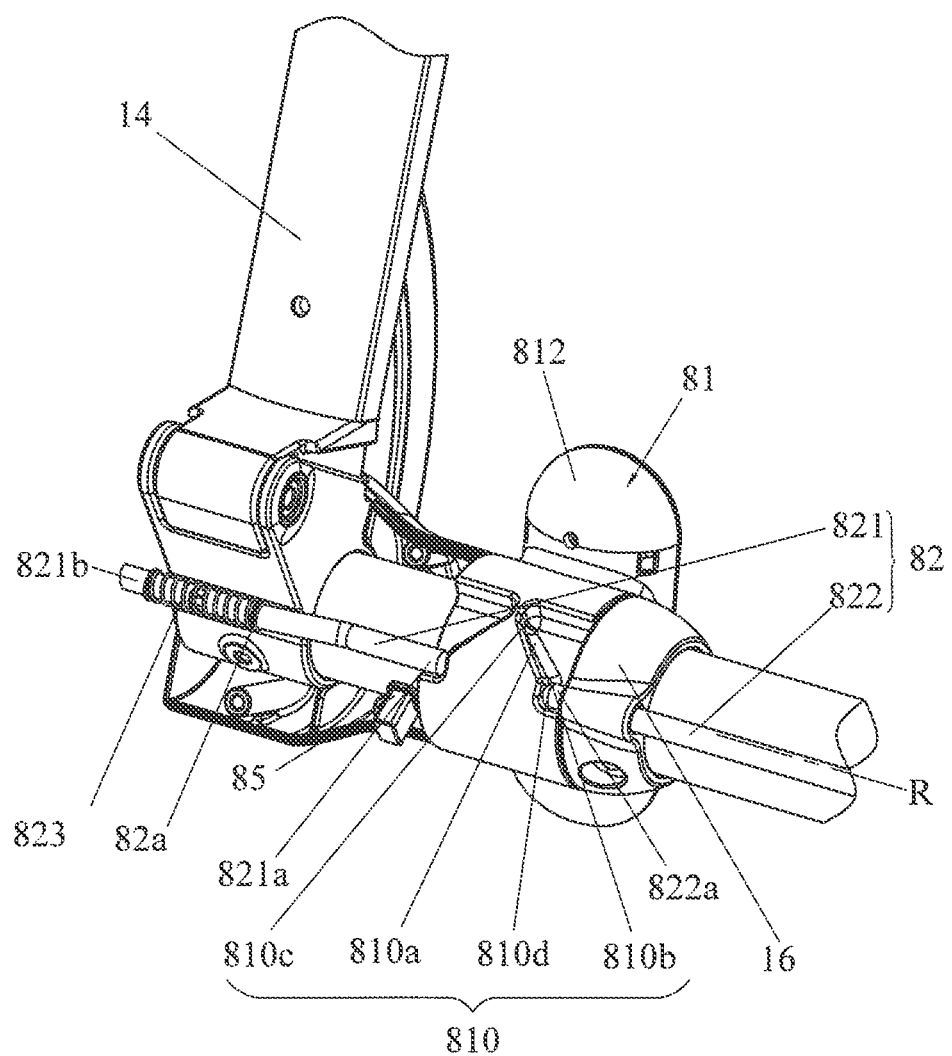
FIG. 30 is a schematic view illustrating the brake mechanism shown in FIG. 26 in a locking state.
Figure 31:
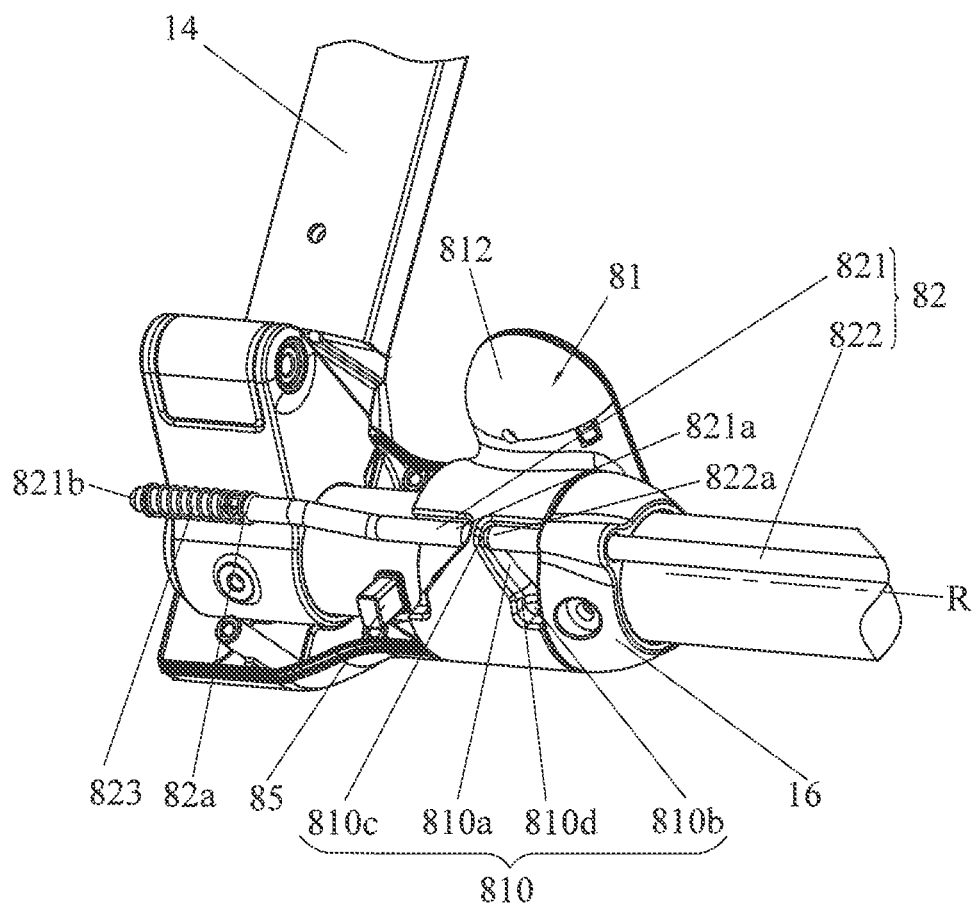
FIG. 31 is a schematic view illustrating the brake mechanism shown in FIG. 26 in an unlocking state.

Exemplary operation of the brake mechanism 300 is described hereinafter with reference to FIGS. 30 and 31. When the brake mechanism 300 is in the unlocking state as shown in FIG. 31, the springs 823 can respectively bias the latches 821 and 822 toward each other so that the first ends 821a and 822a thereof are respectively positioned in the unlocking recesses 810c.

For switching the brake mechanism 300 to the locking state, the pedal portion 812 can be operated so as to cause rotation of the brake actuator 81 around the rotation axis R. As a result, the cam surfaces 810a rotates about the rotation axis R to cause the first ends 821a and 822a of the latches 821 and 822 to disengage from the unlocking recesses 810c and relatively move toward the locking recesses 810b. During rotation of the brake actuator 81, the first ends 821a and 822a of the latches 821 and 822 can be kept in sliding contact against the cam surfaces 810a owing to the biasing action of the springs 823. A stable locking state where the latches 821 and 822 suitably engage with the hub portions 12a of the two wheels 12 can be reached when the first ends 821a and 822a are positioned in the locking recesses 810b as shown in FIG. 30. The first ends 821a and 822a of the latches 821 and 822 can be retained in the locking recesses 810b by the protrusions 810d, which can prevent reverse displacement toward the unlocking state induced by the action of the springs 823.

For switching the brake mechanism 300 from the locking state to the unlocking state, the pedal portion 812 can be operated so as to cause reverse rotation of the brake actuator 81 around the rotation axis R. As a result, the cam surfaces 810a rotates about the rotation axis R to cause the first ends 821a and 822a of the latches 821 and 822 to disengage from the locking recesses 810b and relatively move toward the unlocking recesses 810c. During rotation of the brake actuator 81, the first ends 821a and 822a of the latches 821 and 822 can be kept in sliding contact with the cam surfaces 810a owing to the biasing action of the springs 823. A stable unlocking state where the latches 821 and 822 are disengaged from the hub portions 12a of the two wheels 12 can be reached when the first ends 821a and 822a are positioned in the unlocking recesses 810c as shown in FIG. 31.

The brake mechanisms as described herein can include brake actuating assemblies having cam surfaces operable to rotate about the rotation axis of the two transversally spaced-apart wheels. The rotational displacement of the cam surfaces can drive concurrent displacements of the latches to effect rotational locking and unlocking of the two wheels. The brake mechanisms are relatively simple in construction, and can be easy to operate.

Realizations of the brake mechanisms been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A brake mechanism for use in an infant stroller apparatus, comprising:
   two wheel supports adapted to affix with two transversally spaced-apart legs of the infant stroller apparatus;
   two wheels respectively assembled with the two wheel supports about a rotation axis, wherein each of the two wheels includes a hub portion;
   two latches respectively assembled with the two wheel supports and operable to rotationally lock the two wheels; and
   two brake actuators respectively disposed adjacent to the two wheel supports, and a cable having two opposite ends respectively anchored with the two brake actuators, each of the two brake actuators respectively having a cam surface, at least one of the two brake actuators having a ridge that projects along the rotation axis and defines the cam surface associated therewith, the two cam surfaces of the two brake actuators being respectively in sliding contact with the two latches, wherein the two brake actuators are rotatable about the rotation axis to cause displacements of the two latches parallel to the rotation axis to respectively engage and disengage the hub portions of the two wheels, the cable coupling each other the two brake actuators.

2. The brake mechanism according to claim 1, wherein the ridge further defines an unlocking recess and a locking recess, the cam surface defined on the ridge extending between the unlocking and locking recesses, one corresponding latch being positioned in the unlocking recess to disengage from the corresponding hub portion and in the locking recess to engage with the corresponding hub portion.

3. The brake mechanism according to claim 1, wherein at least a first one of the two wheel supports has a first and a second side surface opposite to each other, the wheel and the brake actuator associated with the first wheel support are respectively assembled adjacent to the first and second side surface.

4. The brake mechanism according to claim 3, further including an axle restraint member disposed adjacent to the brake actuator on the second side surface, the axle restraint member being operable along a radial direction relative to the rotation axis to block axial displacement of the wheel located adjacent to the first side surface.

5. The brake mechanism according to claim 1, wherein at least a first one of the two wheel supports includes a fixed part adapted to affix with one of the legs, and a pivotal part pivotally connected with the fixed part, the pivotal part has a first and a second side surface opposite to each other, the wheel and the brake actuator associated with the first wheel support are respectively assembled adjacent to the first and second side surface.

6. The brake mechanism according to claim 5, further including a shock absorber disposed between the fixed part and the pivotal part.

7. The brake mechanism according to claim 1, wherein at least one of the two brake actuators is affixed with a pedal portion.

8. The brake mechanism according to claim 1, further including two springs operable to respectively bias the two latches into sliding contact with the two cam surfaces.

9. An infant stroller apparatus comprising:
a support frame having two rear legs; and
the brake mechanism according to claim 1 assembled with the two rear legs.

10. A brake mechanism for use in an infant stroller apparatus, comprising:
two wheel supports adapted to affix with two transversally spaced-apart legs of the infant stroller apparatus;
two wheels respectively assembled with the two wheel supports about a rotation axis, wherein each of the two wheels includes a hub portion;
two latches respectively assembled with the two wheel supports and operable to rotationally lock the two wheels; and
a brake actuating assembly including two cam surfaces in sliding contact with the two latches, wherein the brake actuating assembly includes:
two brake actuators respectively disposed adjacent to the two wheel supports, each of the two brake actuators having a cam surface, the two cam surfaces of the two brake actuators being operable to rotate about the rotation axis to cause displacements of the two latches parallel to the rotation axis to respectively engage and disengage the hub portions of the two wheels;
a linkage extending transversally and connected with the two brake actuators, the linkage including a cable having two opposite ends respectively anchored with the two brake actuators, the connection of the linkage enabling the two brake actuators to rotate in unison; and
a spring assembled around a portion of the cable adjacent to one of the two ends of the cable, the spring being respectively connected with the brake actuator and the wheel support associated therewith.

11. The brake mechanism according to claim 10, wherein the spring is connected with one of the two brake actuators, and the other one of the two brake actuators is affixed with a pedal.

12. The brake mechanism according to claim 10, wherein at least a first one of the two wheel supports includes a fixed part adapted to affix with one of the legs, and a pivotal part pivotally connected with the fixed part, the pivotal part has a first and a second side surface opposite to each other, the wheel and the brake actuator associated with the first wheel support are respectively assembled adjacent to the first and second side surface.

13. The brake mechanism according to claim 12, further including a shock absorber disposed between the fixed part and the pivotal part.

14. A brake mechanism for use in an infant stroller apparatus, comprising:
two wheel supports adapted to affix with two transversally spaced-apart legs of the infant stroller apparatus;
two wheels respectively assembled with the two wheel supports about a rotation axis, wherein each of the two wheels includes a hub portion;
two latches respectively assembled with the two wheel supports and operable to rotationally lock the two wheels; and
a brake actuating assembly including a brake actuator, the brake actuator including a collar portion, and a pedal portion affixed with the collar portion, an outer surface of the collar portion including two pockets symmetrical in structure in which are formed two cam surfaces, the two cam surfaces being in sliding contact with the two latches, and the two cam surfaces being operable to rotate about the rotation axis to cause displacements of the two latches parallel to the rotation axis to respectively engage and disengage the hub portions of the two wheels.

15. The brake mechanism according to claim 14, wherein the collar portion is pivotally assembled about a tube that extends transversally and is affixed with the two wheel supports.

16. The brake mechanism according to claim 15, wherein two opposite ends of the tube are respectively affixed with two bearing parts through which axles of the wheels are pivotally assembled.

17. A brake mechanism for use in an infant stroller apparatus, comprising:
two wheel supports adapted to affix with two transversally spaced-apart legs of the infant stroller apparatus;
two wheels respectively assembled with the two wheel supports about a rotation axis, each of the two wheels having a hub portion;
two latches respectively assembled with the two wheel supports and operable to rotationally lock the two wheels; and
two brake actuators respectively disposed adjacent to the two wheel supports and respectively affixed with two opposite ends of a transversal linkage, each of the two brake actuators including an actuating element formed with an annular ring, the annular ring having a contact surface that faces one hub portion and is disposed around the rotation axis, and a recess formed in the contact surface, the annular rings of the two brake actuators being respectively in sliding contact with the two latches;
wherein the two brake actuators are rotatable in unison about the rotation axis to cause displacements of the two latches parallel to the rotation axis to respectively engage and disengage the hub portions of the two wheels, the two latches when positioned in the recesses of the two brake actuators being disengaged from the hub portions, and the two latches when contacting with the contact surfaces of the two brake actuators being engaged with the hub portions.

18. The brake mechanism according to claim 17, wherein the transversal linkage is an elongated tube, and the two brake actuators are affixed with the two opposite ends of the tube.

19. The brake mechanism according to claim 17, wherein each of the two latches has an elongated shape with a first and a second end portion opposite to each other, the first end portion being engaged in contact with the annular ring of one brake actuator, and the second end portion being engageable with one hub portion.

20. The brake mechanism according to claim 17, wherein the transversal linkage is affixed with a pedal arranged at a middle location between the two opposite ends of the transversal linkage.

* * * * *